United States Patent
Rowinski et al.

(10) Patent No.: US 7,783,138 B2
(45) Date of Patent: Aug. 24, 2010

(54) FREE-SPACE INTEGRATED PHOTODETECTOR WITH REDUCED PHASE TRACKING ERROR

(75) Inventors: Roman T. Rowinski, South Hadley, MA (US); Gregory J. McBrien, Glastonbury, CT (US); Karl Kissa, West Simsbury, CT (US); Eric Lim, Simsbury, CT (US)

(73) Assignee: JDS Uniphase Corporation, Milpitas, CA (US)

( * ) Notice: Subject to any disclaimer, the term of this patent is extended or adjusted under 35 U.S.C. 154(b) by 95 days.

(21) Appl. No.: 12/271,154

(22) Filed: Nov. 14, 2008

(65) Prior Publication Data

US 2009/0129719 A1  May 21, 2009

Related U.S. Application Data

(60) Provisional application No. 60/988,517, filed on Nov. 16, 2007.

(51) Int. Cl.
G02F 1/035 (2006.01)
(52) U.S. Cl. .................. 385/3; 359/239; 359/245

(58) Field of Classification Search ............... 385/3; 359/239, 245
See application file for complete search history.

(56) References Cited

U.S. PATENT DOCUMENTS

| 4,768,848 | A | 9/1988 | Vaerewyck | 385/14 |
|---|---|---|---|---|
| 5,111,518 | A | 5/1992 | Okada | 385/14 |
| 5,259,044 | A | 11/1993 | Isono et al. | 385/2 |
| 5,764,400 | A | 6/1998 | Itou et al. | 359/245 |
| 5,953,466 | A | 9/1999 | Kubota et al. | 385/2 |
| 5,963,357 | A | 10/1999 | Kubota et al. | 359/239 |
| 6,668,103 | B2 | 12/2003 | Hosoi | 385/2 |
| 7,200,289 | B2 | 4/2007 | Yamada et al. | 385/3 |

*Primary Examiner*—Jerry T Rahll
(74) *Attorney, Agent, or Firm*—Matthew A. Pequignot; Pequignot + Myers LLC

(57) ABSTRACT

A Mach-Zehnder (MZ) interferometer modulator structure for fiberoptic telecommunications is disclosed in which drift of the operating point can be monitored with a reduced phase tracking error. One or more components of free-space light radiated into the substrate of the MZ modulator are selectively detected with one or more photodetectors. Suitable summing circuits are described for nulling out undesired photocurrent contributions in the photodetector(s) from on-state and off-state light radiated from the MZ.

12 Claims, 27 Drawing Sheets

FREE-SPACE INTEGRATED PHOTODETECTOR WITH REDUCED PHASE TRACKING ERROR

CROSS-REFERENCE TO RELATED APPLICATIONS

The present invention claims priority from U.S. Provisional Patent Application No. 60/988,517 filed Nov. 16, 2007, which is incorporated herein by reference.

TECHNICAL FIELD

The present invention is directed to free-space photo-monitor with reduced tracking error for a Mach-Zehnder optical modulator for fiberoptic transmission systems.

BACKGROUND OF THE INVENTION

The invention applies to Mach-Zehnder (MZ) modulators where a high-speed signal is applied to an RF electrode and a separate slowly-varying DC voltage is applied either to the same RF electrode, or to a separate bias electrode. This DC voltage, also called a bias voltage, maintains the bias set point of the interferometer at quadrature, keeping the optical power midway between the full on state and full off state in the absence of an applied RF signal. An AC RF signal applied then swings the optical power either partially or completely from full on to full off, symmetrically about the quadrature point. An additional small AC dither signal of frequency $f_{dither}$ is superimposed on the RF signal, either electronically added or multiplied to the RF signal. The superimposed AC dither signal causes a small optical AC signal to be created in the output of the modulator that can be monitored by a photodetector. The DC bias is adjusted until the fundamental of $f_{dither}$ that appears in the photocurrent is at a maximum. Alternatively, a second harmonic of $f_{dither}$ that appears in the photocurrent can be nulled. The adjustment of the DC bias is provided by a feedback circuit that synchronously detects the AC dither signal and its harmonics in the photocurrent output of the photodetector.

The amount of voltage needed to keep the bias point of the interferometer at quadrature varies with time, temperature, and wavelength, hence a photodetector (to detect optical power) and feedback circuit (to control a voltage) are needed to keep the bias point at the desired point. Note that in some communications applications, the modulator bias point may need to be set at or near full on or full off, or the RF voltage(s) may vary phase of the output light, as well as intensity. In any case, the method of controlling the bias point is similar. One critical aspect of the bias control is the photodetector needed to create a photocurrent or photovoltage that is proportional to either (1) the optical power of on-state light that is coupled into the output optical fiber, or
(2) the optical power of off-state light that is radiated into the substrate of the modulator.

Methods of controlling the bias point exist for either scenario. One key problem solved by the invention is the phase tracking error between the transfer curve of the modulator and the transfer curve observed via the photodetector for the latter case, where part of the optical path is unguided in the substrate and/or free-space outside of the substrate.

FIG. 1 shows a conventional prior art Mach-Zehnder (MZ) interferometer modulator 100. An optical signal from an input fiber is coupled into an input optical waveguide 102, in which the lateral field distribution is represented by curve 101. The optical signal is split into two parts 101a, 101b with a y-junction 103a. Each waveguide 104a, 104b following the first y-junction 103a is modulated by a set of electrodes 105a-c in close proximity to the waveguides 104a, 104b. A second y-junction 103b combines the modulated optical signals 101a, 101b. The figure shows electrodes corresponding to a modulator made in x-cut lithium niobate substrate, however, a design for z-cut lithium niobate substrate operates in an analogous manner.

The applied field from the electrodes 105a-c results in a change in the optical phase difference between the modulated optical signals 101a, 101b in the two arms 104a, and 104b of the MZ. If the two modulated optical signals 101a, 101b have a zero optical phase difference, they form a single-lobed guided mode 101c after being combined by the second y-junction 103b into output waveguide 106, resulting in little loss of optical power. If the two modulated optical signals 101a, 101b have an optical phase difference of $\pi$ (or 180°), then they combine to form a double-lobed higher-order unguided mode 101d that is not supported by the output waveguide 106, causing the light to radiate into the substrate. The radiated light is strongest on both sides of the waveguide 106, approximately into areas 107L and 107R, and weakest in the center, near output waveguide 106. Note that the two lobes have opposite sign in optical field, but have the same intensity.

FIGS. 2(a) and 2(b) show two-dimensional (2D) Beam Propagation Method (BPM) simulations of the MZ operation. The figures show contour plots of the square root of optical intensity (E-field magnitude) for the cases of 0 or $\pi$ phase difference between the arms of the MZ, respectively, which correspond to on and off switch states of the MZ. Note that in the off-state, the light is radiated primarily in two lobes. The double-lobed beam thus created upon recombination at the output y-junction 103b is rejected by an output fiber coupled to the output waveguide 106. The ripple in the radiation pattern is caused by interference between the radiated light and light radiated elsewhere in the simulation that reflects off the simulation boundary and overlaps the light radiated at the output y-junction 103b. More elaborate 3D BPM simulations show that the off-state radiation lobes not only travel outward, but downward, as well.

FIG. 3 is a graph of intensity vs. drive voltage, for both light intensity in the guided mode 301 reaching the output fiber (dashed line) and the intensity of light radiated into the substrate 302 (solid line). Maximum intensity for light in the output fiber 301a occurs for $V=\pm 0.5\ V_\pi$, whereas minimum intensity at the output 301b occurs for $V=0V$. The curve for intensity of radiated light is the exact opposite, reaching a maximum 302a when light in the output fiber is a minimum and vice versa. The quadrature point 303 is midway between maximum and minimum points along the transfer curves. The dashed plot 301 is referred to as the transfer curve of the MZ, for light output by the MZ. Ideally, the photocurrent in a free-space photodiode is proportional to the light intensity radiated into the substrate, which is represented by the solid curve 302.

FIG. 4a shows a prior art MZ modulator assembly 400 with a free-space photodetector (PD) 407 integrated with a modulator chip 410. The embodiment shown in FIG. 4a is similar to those described in U.S. Pat. Nos. 5,953,466 and 5,963,357. An input light signal is coupled into the MZ input waveguide 402 from input optical fiber 411a held in place on the modulator chip 410 by a transparent fiber block 412a. As before, the light in input waveguide 402 is split into two arms 404a, 404b of the MZ, modulated by electrodes 405a-c and recombined into output waveguide 406. The output waveguide 406 is coupled into an output optical fiber 411b, attached to the modulator chip 410 by a transparent fiber block 412b. The PD 407, located underneath the output optical fiber 411b collects light that is radiated into the substrate, after it passes through the transparent fiber block 412b. The PD 407 may or may not be biased with a voltage across it. The light illuminating the PD 407 causes a photocurrent to be generated. The PD 407 is connected to an electrical circuit such as a transimpedance amplifier or op amp circuit that amplifies the photocurrent, converting it into a voltage. Typically, the electrical circuit is external to the modulator.

FIG. 4b is a side view of the prior art MZ modulator assembly 400 shown in FIG. 4a. The dashed arrows illustrate the path followed by off-state light emitted from the output waveguide 406 on the modulator chip 410 passing through substrate 410a at an acute angle slanting away from the top surface of the modulator chip 410 and through the transparent fiber block 412b to the PD 407 located underneath the output optical fiber 411b.

FIG. 4c shows a close-up of the transparent fiber block 412b, output optical fiber 411b, and PD 407. The arrows represent light radiated from different locations of the modulator (not visible in this view). The thick solid line arrows represent the off-state light radiated into the substrate when the MZ is switched off. There are additional components of radiated light coming from the modulator due to optical loss of various structures in the device. The thick dashed line arrows represent on-state light lost in the MZ output y-junction even when the MZ is switched fully on. This radiated on-state light is an amount of light radiated into the substrate that is proportional to the light launched into the output optical fiber 411b.

The thin dotted line arrows represent another component of radiated on-state light, coming from the junction of the modulator output optical waveguide and the output optical fiber. In general, this component of radiated on-state light is much larger than the component coming from y-junctions and other features along the modulator, however is comparable to the amount of light radiated into the substrate at the junction of the input optical fiber and the modulator input optical waveguide. Note that these on-state light components are strongest along the direction of the fiber, and are weaker for more diverging angles. On the other hand, the off-state light components are strongest in the diverging angle direction and weak along the direction of the output fiber. In prior art modulators, the on-state light also reaches the photodetector, creating an interference pattern that depends on the drive voltage.

FIG. 4d shows another example of a prior art MZ modulator assembly 430 with a free-space PD 407 using a mirror or mirrored surface 415 to reflect the light and direct it to the PD 407. The embodiment shown in FIG. 4d is similar to designs described in U.S. Pat. No. 7,200,289, in which off-state light captured by an output fiber block is deflected to a photodetector. The back of the output fiber block may have an oblique angle and may be reflective. The addition of the mirror 415 allows the PD 407 to be positioned in a location that is closer to a shelf within the assembly 430, allowing a simpler means of electrical connection. The surface of the mirror 415 may be polished or roughened. A rough surface causes the reflected light to be diffused to a larger degree, which may be desirable, if the photodetector is positioned far away from the output optical fiber or pigtail 411b. A more diffuse reflection increases the possibility of multiple reflections, causing the reflected light to travel farther. Hence, a diffuse reflection simplifies the choice of photodetector location, as the entire cavity of the modulator package is illuminated by the reflected light.

FIG. 5 is a plot of the detected signal in relative units vs. normalized drive voltage on a MZ modulator. The solid line 502 is the ideal curve, which is proportional to the radiated off-state light 302 plotted in FIG. 3. The dashed curve 504 shows the detected signal for the case where the magnitude of on-state light is significant compared to the off-state light. Note that the dashed curve 504 not only shows a low on/off ratio, given by the ratio of its maximum to minimum values, but is also shifted laterally along the voltage axis. The amount of lateral shift from ideal is referred to as the PD phase tracking error.

The feedback circuit controlling bias voltage sets the bias point to quadrature point of the PD transfer curve, which is shifted slightly from the true quadrature point of the transfer curve of optical power transmitted to the output optical fiber. Hence, there is an error in setting the bias voltage, which results in degradation in system performance. There is some also some impairment due to the reduction of on/off ratio, namely reduced gain in the control loop, and some additional noise, however, these impairments can be largely overcome by proper design of the feedback control circuit.

The limitations of prior art free-space integrated photodetector designs can be overcome by understanding the cause of the tracking error in more detail. The E-field of radiated light on the left and right sides of the output waveguide are given by Equations 1 and 2, respectively.

$$E_A = A_{01}\cos(\theta) + j A_{11}(\cos(\phi) + j\sin(\phi))\sin(\theta) \quad (1)$$

$$E_B = A_{02}\cos(\theta) - j A_{12}(\cos(\phi) + j\sin(\phi))\sin(\theta) \quad (2)$$

The coefficients $A_{01}$ and $A_{02}$ represent the field strength of on-state light reaching the photodetector at the two locations, labeled 107L and 107R in FIGS. 1, 2a and 2b, respectively, whereas the coefficients $A_{11}$ and $A_{12}$ represent the field strength of off-state light at those locations. The symbol 'j' represents the imaginary unit, which equals the square root of −1. The strength of on-state and off-state light is represented by $\cos(\theta)$ and $\sin(\theta)$, respectively, due to the interference effect produced by the MZ. The $\cos(\phi)+j\sin(\phi)$ term accounts for the unknown phase relationship between on-state and off-state light that can change as a function of location, wavelength, and/or temperature. Note that the E-field polarity of on-state light has the same sign on both sides of the output waveguide due to symmetry, while the E-field polarity of off-state light is intrinsically different in sign, due to the anti-symmetry of the first higher-order mode. The intensity of the light reaching the photodetector at the two locations is given by $$I_A = A_{01}^2 \cos^2(\theta) + A_{11}^2 \sin^2(\theta) - 2 A_{01} A_{11} \sin(\theta)\cos(\theta)\sin(\theta) \quad (3)$$

$$I_B = A_{02}^2 \cos^2(\theta) + A_{12}^2 \sin^2(\theta) + 2 A_{02} A_{12} \sin(\phi)\cos(\theta)\sin(\theta) \quad (4)$$

The last term of Equations 3 and 4 is caused by the coherent interference between on-state and off-state light, and is the cause of phase tracking error. The total photocurrent, assuming the photodetector covers locations L and R, is given by $$i_{total} = (R_A A_{01}^2 + R_B A_{02}^2)\cos^2(\theta) + (R_A A_{11}^2 + R_B A_{12}^2)\sin^2(\theta) + 2(R_B A_{02} A_{12} - R_A A_{01} A_{11})\sin(\phi)\cos(\theta)\sin(\theta), \quad (5)$$

where $R_A$ and $R_B$ are the photodetector responsivity at the two locations. The last term in Equation 5 is responsible for phase tracking error. Note that it equals zero when $$R_B A_{02} A_{12} = R_A A_{01} A_{11}. \quad (6)$$

If responsivities, field strengths of on-state light, and field strength of off-state light are exactly the same for the two locations, then Equation 6 is satisfied, that is $$R_B = R_A \quad A_{01} = A_{02} \quad A_{11} = A_{12} \quad (7)$$

FIG. 4e shows a prior art design with two photodetectors 407a and 407b, where Equation 7 is valid, allowing the simple circuits shown in FIGS. 6a, 6b to be used. Each photodetector 407a, 407b collects one lobe of the radiated off-state light in equal proportion. The photodiodes are connected either in series (FIG. 6a) or parallel (FIG. 6b) in order to sum the photocurrents equally, requiring the net responsivities, $R_A$ and $R_B$, to be equal.

The use of common lens to couple light from an output waveguide to a fiber and couple off-state light from a substrate to photodetector surface is shown in Itou (U.S. Pat. No. 5,764,400).

Hosoi (U.S. Pat. No. 6,668,103) describes various ways of deflecting light from one output port of a 3 dB coupler to a monitor photodiode. The path between waveguide output and photodiode is shown as propagating through free-space. Various ways of deflecting light to a photodiode integrated on the substrate are also shown. Part of the optical path may include free-space within the substrate.

Vaerewyck (U.S. Pat. No. 4,768,848) discloses a device having an optical tap coupler on the input waveguide. The light from the tap is directed to a photodetector, while Okada (U.S. Pat. No. 5,111,518) describes a device with a folded waveguide to carry light to a photodetector.

Isono (U.S. Pat. No. 5,259,044) describes a device with a folded optical path where tapped light or Fresnel reflected light is reflected and guided to a photodetector, with a portion of the optical path appears to propagate free-space within the substrate.

In practice, it is difficult to match the field strengths in the two locations. Also, in reality Equation 5 needs to be integrated over the entire surface area of the photodetector, hence all of the parameters are likely to vary somewhat with spatial location, making it more difficult to cancel out the net tracking error term. The strength of the E-fields may also vary with temperature and wavelength, making cancellation of the phase tracking error term more problematic.

It is an object of the present invention to address these difficulties by presenting a MZ modulator structure with light-blocking material on or within an output fiber block and/or around an output optical fiber to block on-state light, and possibly one lobe of off-state light, thereby preventing it from reaching one or more photodiodes used to monitor drift in Mach-Zehnder interferometer modulator.

SUMMARY OF THE INVENTION

The present invention is intended to provide a phase tracking monitor integrated with a Mach-Zehnder interferometric modulator. The phase tracking monitor includes an optical waveguide element comprising an input optical waveguide for receiving an input optical signal, two branched optical waveguides, each guiding a portion of the input optical signal, an input Y-junction optically coupling the input optical waveguide to the two branched optical waveguides, an output optical waveguide optically coupled to an output optical fiber, and an output Y-junction optically coupling the two branched optical waveguides to the output optical waveguide for causing the optical signals propagating from the two branched optical waveguides to interfere with each other.

The optical waveguide element is supported on an upper surface of a substrate comprising an electro-optic dielectric material. A set of electrodes is provided for applying an electric field proximate to the two branched optical waveguides for modulating a phase of the optical signals propagating therethrough. The set of electrodes generate a modulated optical signal having an on-state and an off-state at the output Y-junction. In the on-state the modulated optical signal generates a guided mode in the output waveguide, whereas in the off-state the modulated optical signal generates a radiating mode comprising a left lobe and a right lobe in the substrate. A fiber block is attached to an output edge of the substrate for stably supporting the output optical fiber to receive the guided mode from the output waveguide. A first photodetector is positioned to generate a first photocurrent in response to light transmitted from the output edge of the substrate. Light-blocking material disposed between the output edge of the substrate and the photodetector is used to adjust relative amounts of the radiating mode and the guided mode that reach the photodetector.

A method for reducing phase tracking error in a Mach-Zehnder optical modulator, including an input waveguide, an output waveguide and a set of electrodes supported on a substrate, with an output fiber coupled to the output waveguide via an optical block, is defined, providing the optical modulator with a modulating signal and a bias signal to the set of electrodes, coupling an input signal into the input waveguide, detecting with a first photodetector a first lobe of an off-state radiating mode emitted from a substrate, blocking an on-state mode guided in the output waveguide from reaching the first photodetector with the light-blocking portion, and adjusting the bias signal in response to a first photocurrent in the first photodetector to reduce the phase tracking error.

BRIEF DESCRIPTION OF THE DRAWINGS

The invention will be described in greater detail with reference to the accompanying drawings which represent preferred embodiments thereof, wherein.

DETAILED DESCRIPTION

Reducing the phase tracking error according to this invention has two main aspects:
(1) reducing the influence of any on-state light by balancing the effective responsivities of the photodetectors; and
(2) reducing the amount of on-state light collected by the photodiode(s) that causes the phase tracking error.

Figure 1:
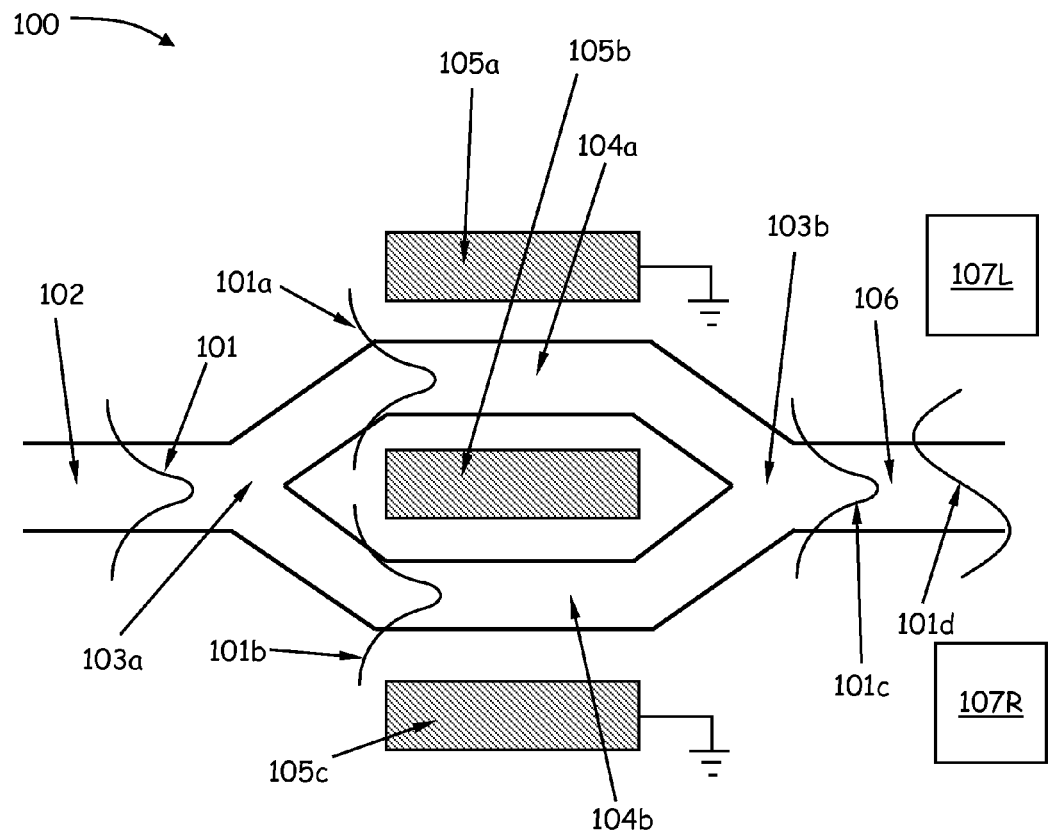
FIG. 1 is a top view of a prior art Mach-Zehnder interferometer modulator.
Figure 2A:
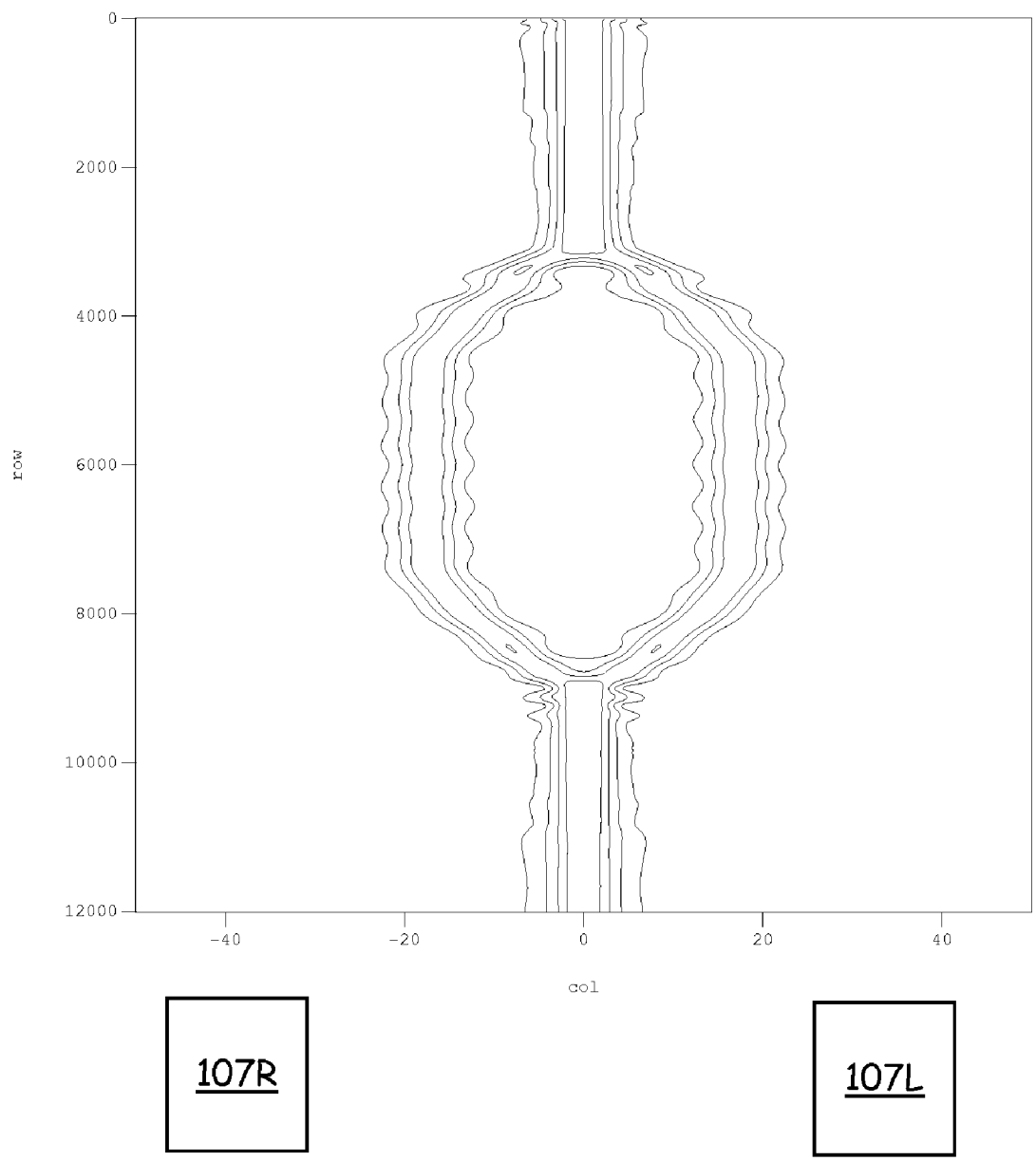
FIG. 2(a) is a contour plot of electric field strength distribution in the plane of a MZ modulator in the on-state.
Figure 2B:
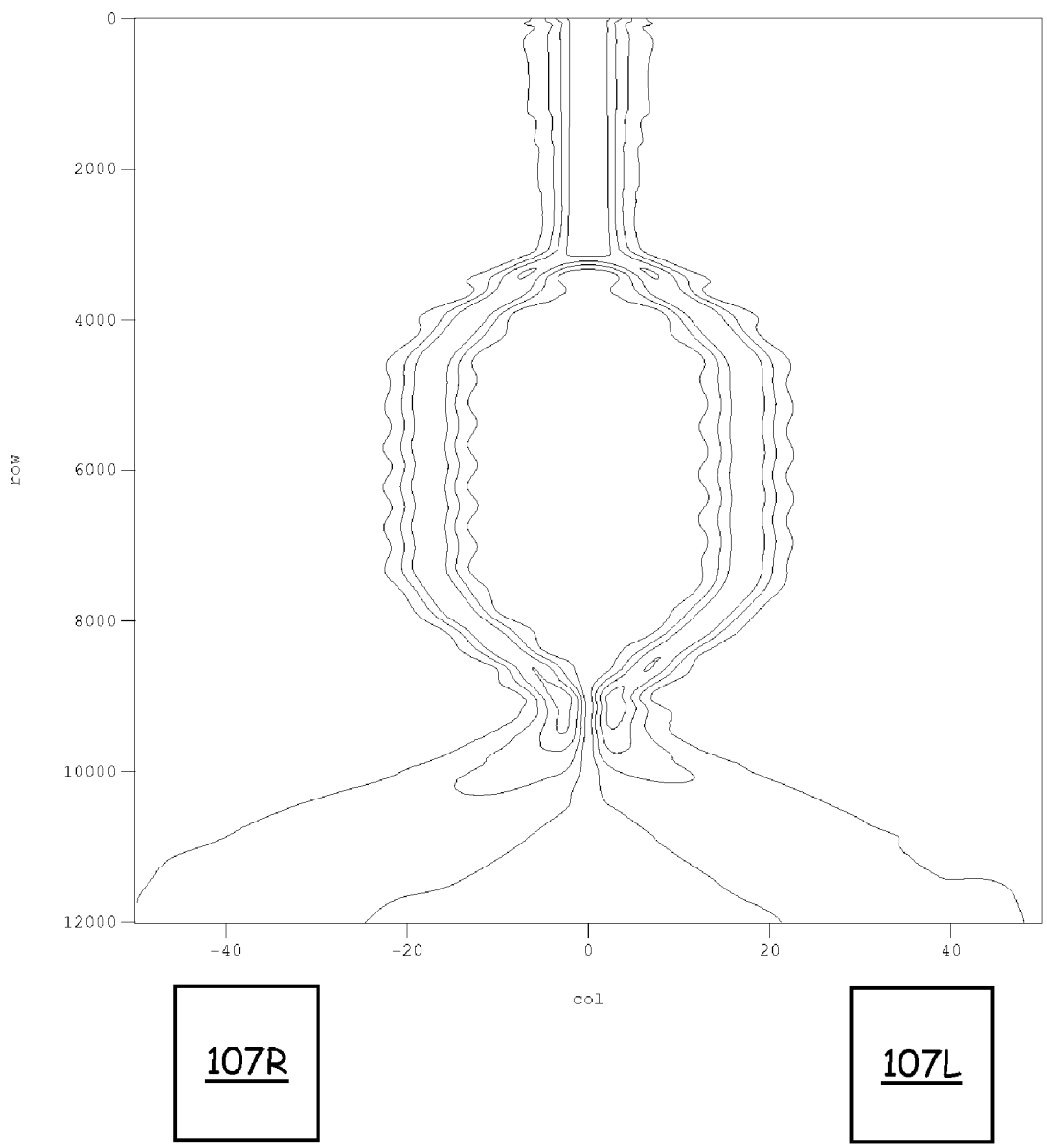
FIG. 2(b) is a contour plot of electric field strength distribution in the plane of a MZ modulator in the off-state.
Figure 3:
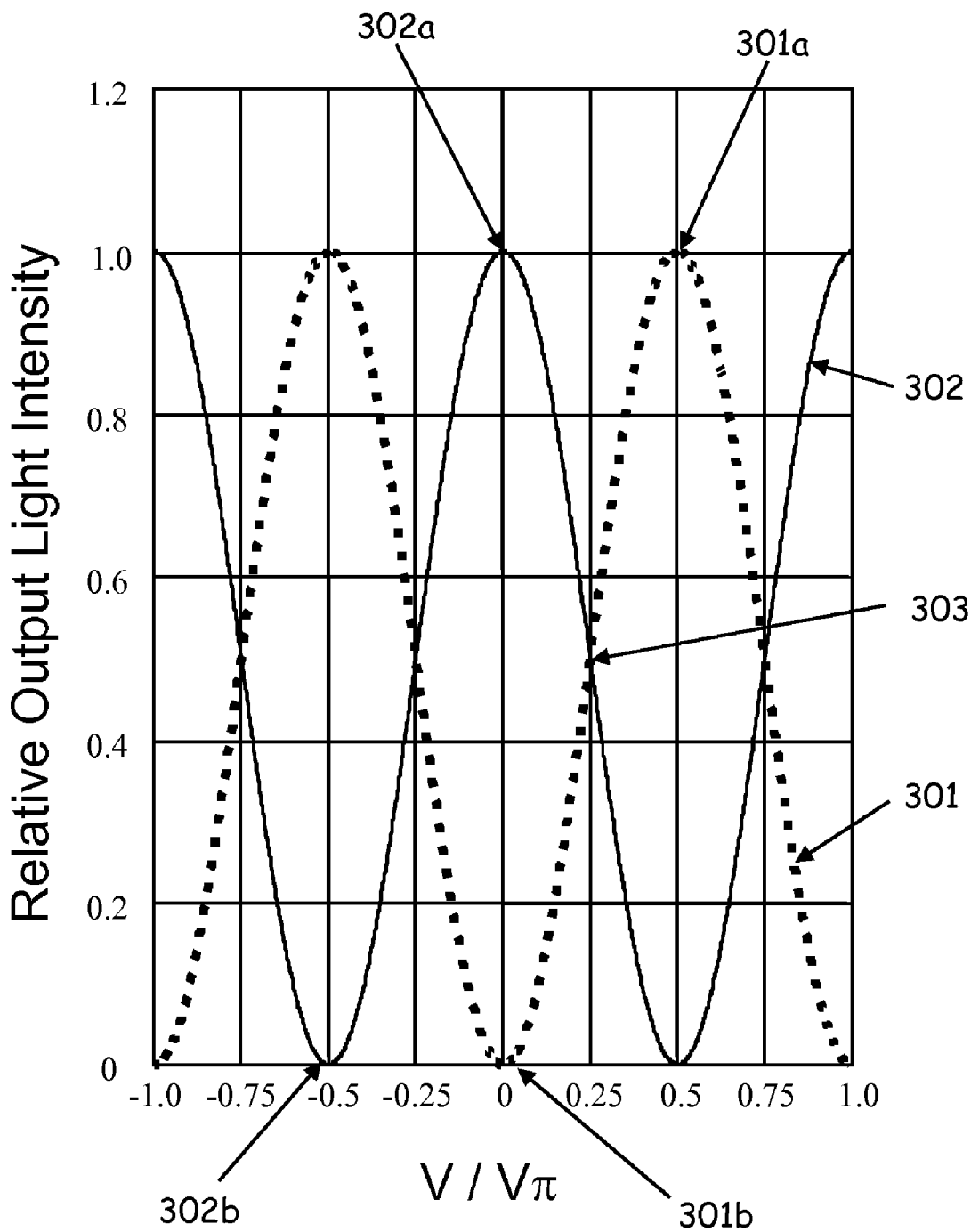
FIG. 3 is a graph of intensity vs. drive voltage, for both light intensity in the guided mode reaching the output fiber (dashed line) and the intensity of light radiated into the substrate (solid line)
Figure 4A:
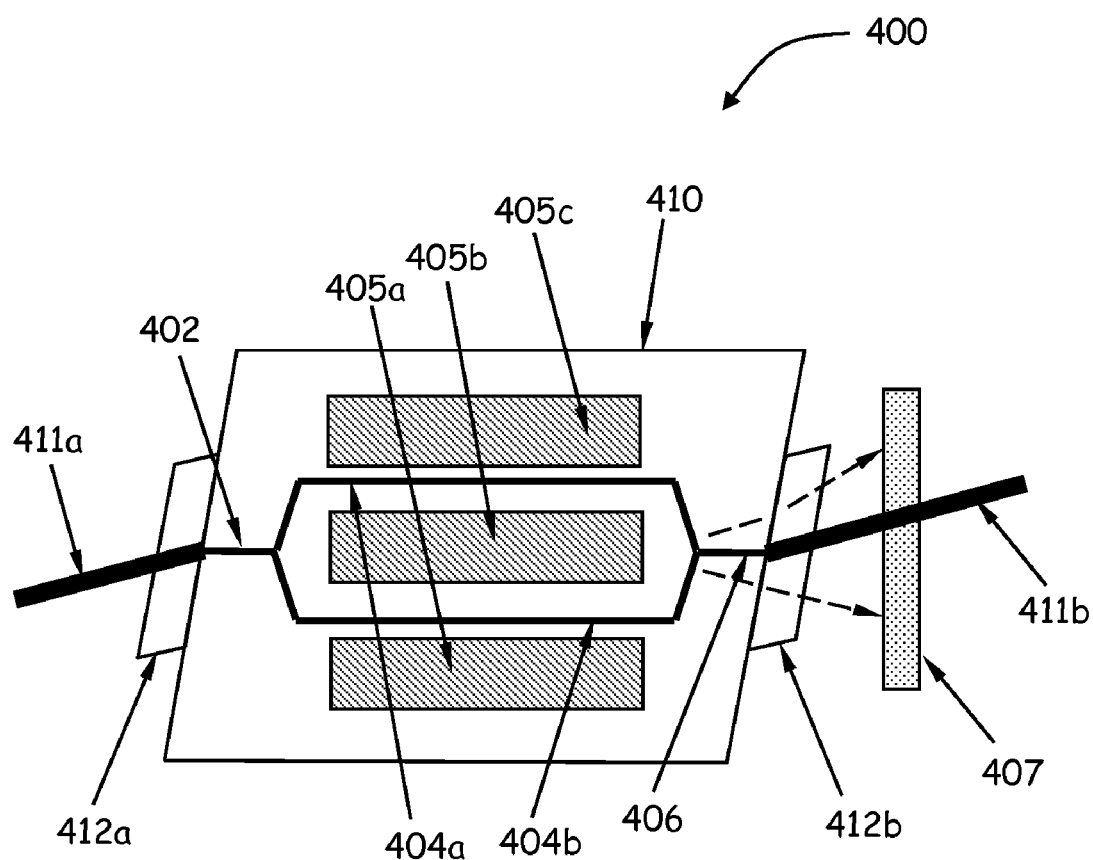
FIGS. 4a and 4b are top and side views, respectively, of a prior art MZ modulator assembly with a free-space photodetector (PD) integrated with a modulator chip.
Figure 4B:
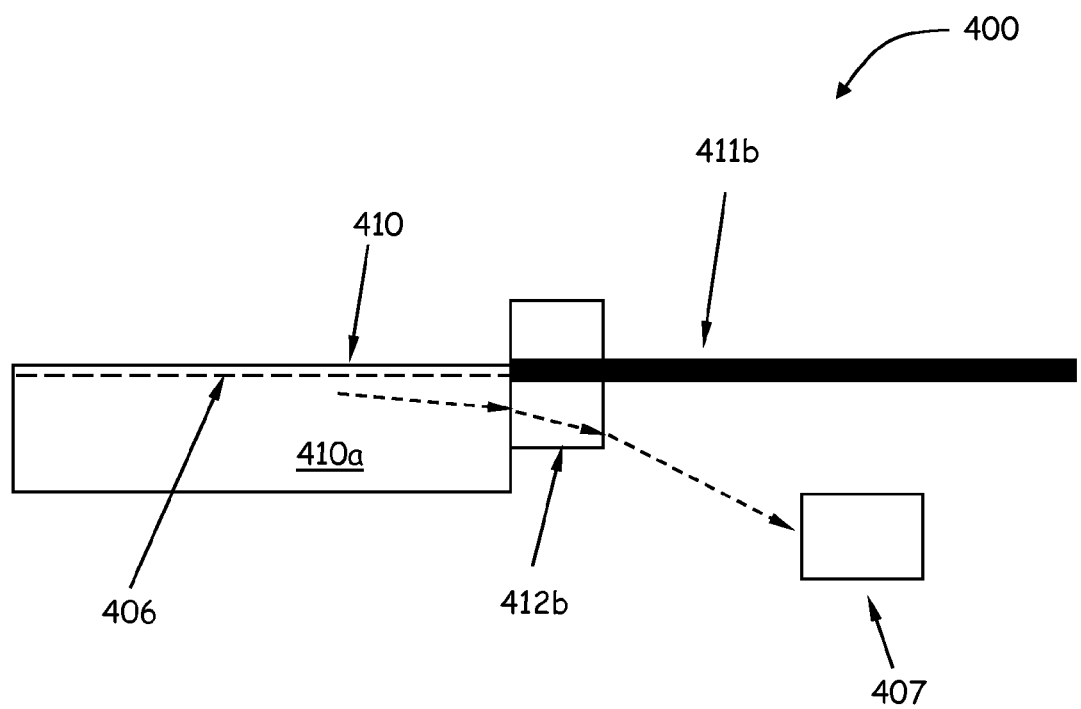
Figure 4C:
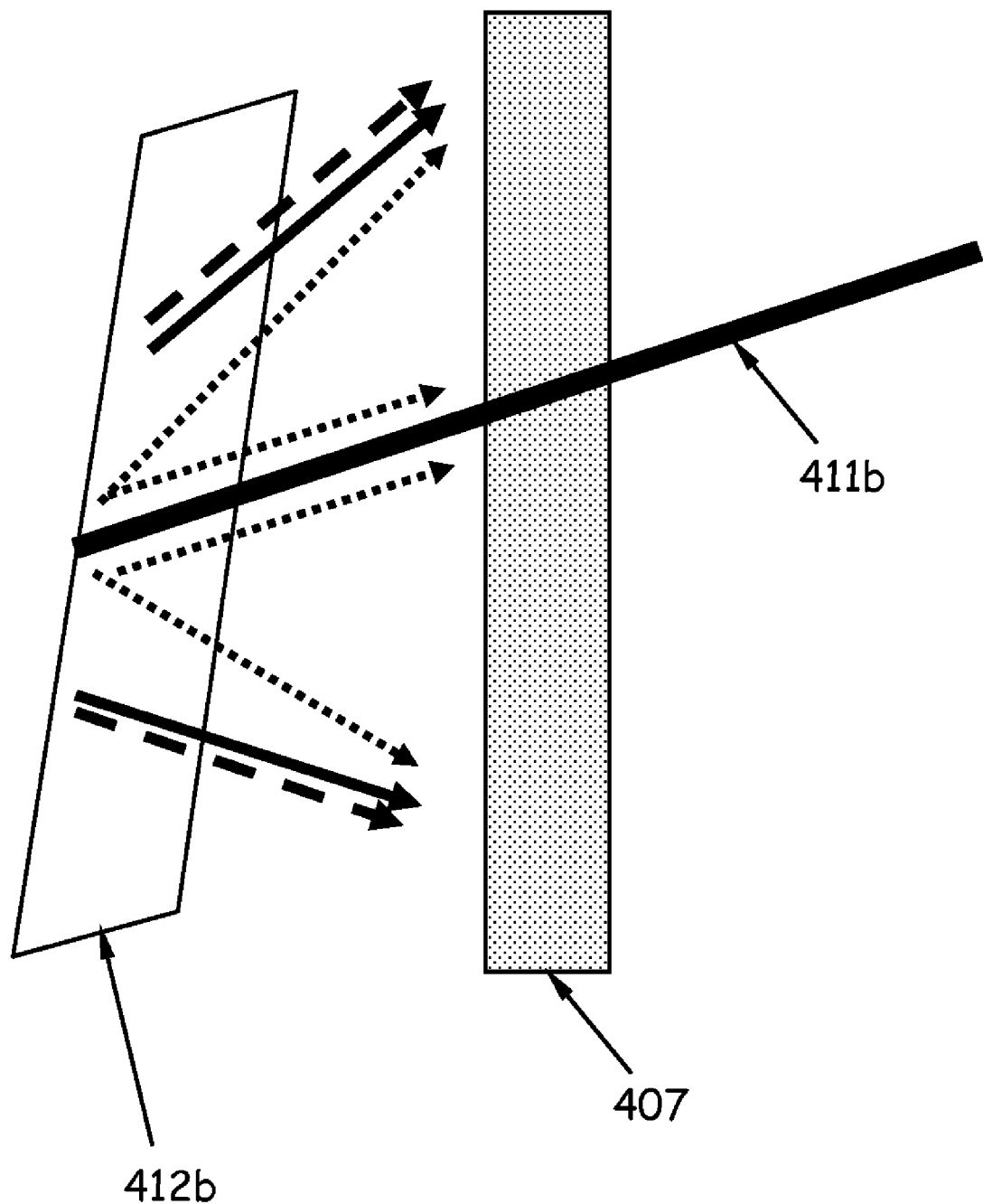
FIG. 4c is a top view of a transparent fiber block, with output optical fiber and PD.
Figure 4D:
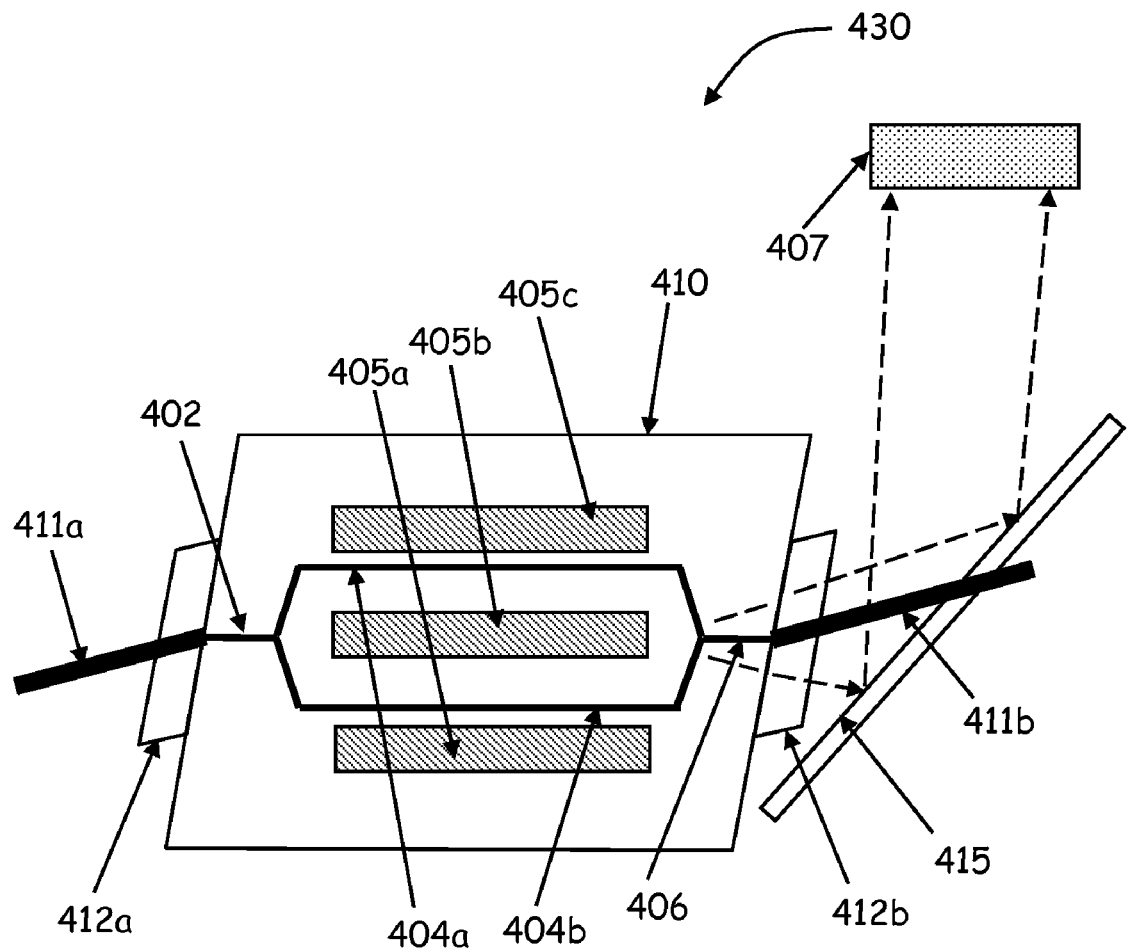
FIG. 4d is a top view of another example of a prior art MZ modulator assembly with a free-space PD using a mirror or mirrored surface to reflect the light and direct it to the PD.
Figure 4E:
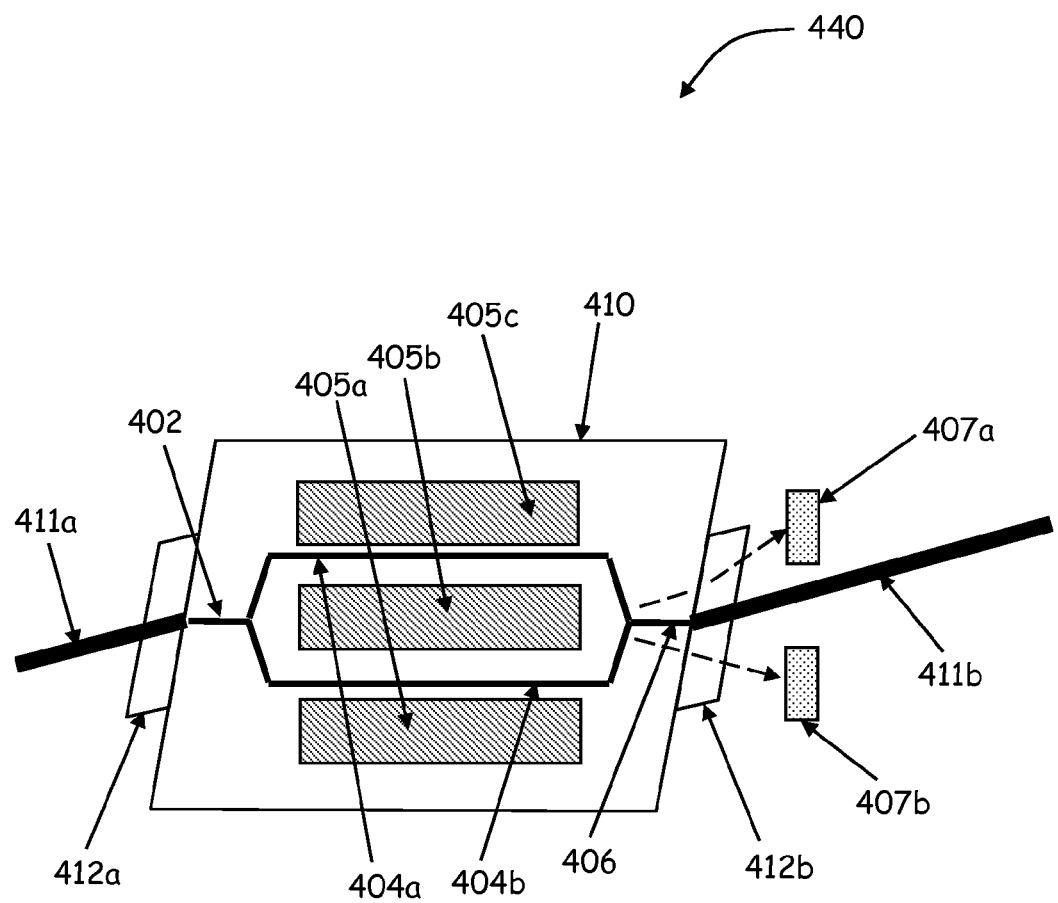
FIG. 4e is a top view of a prior art MZ modulator assembly with a pair of free-space photodetectors (PD) integrated with a modulator chip.
Figure 5:
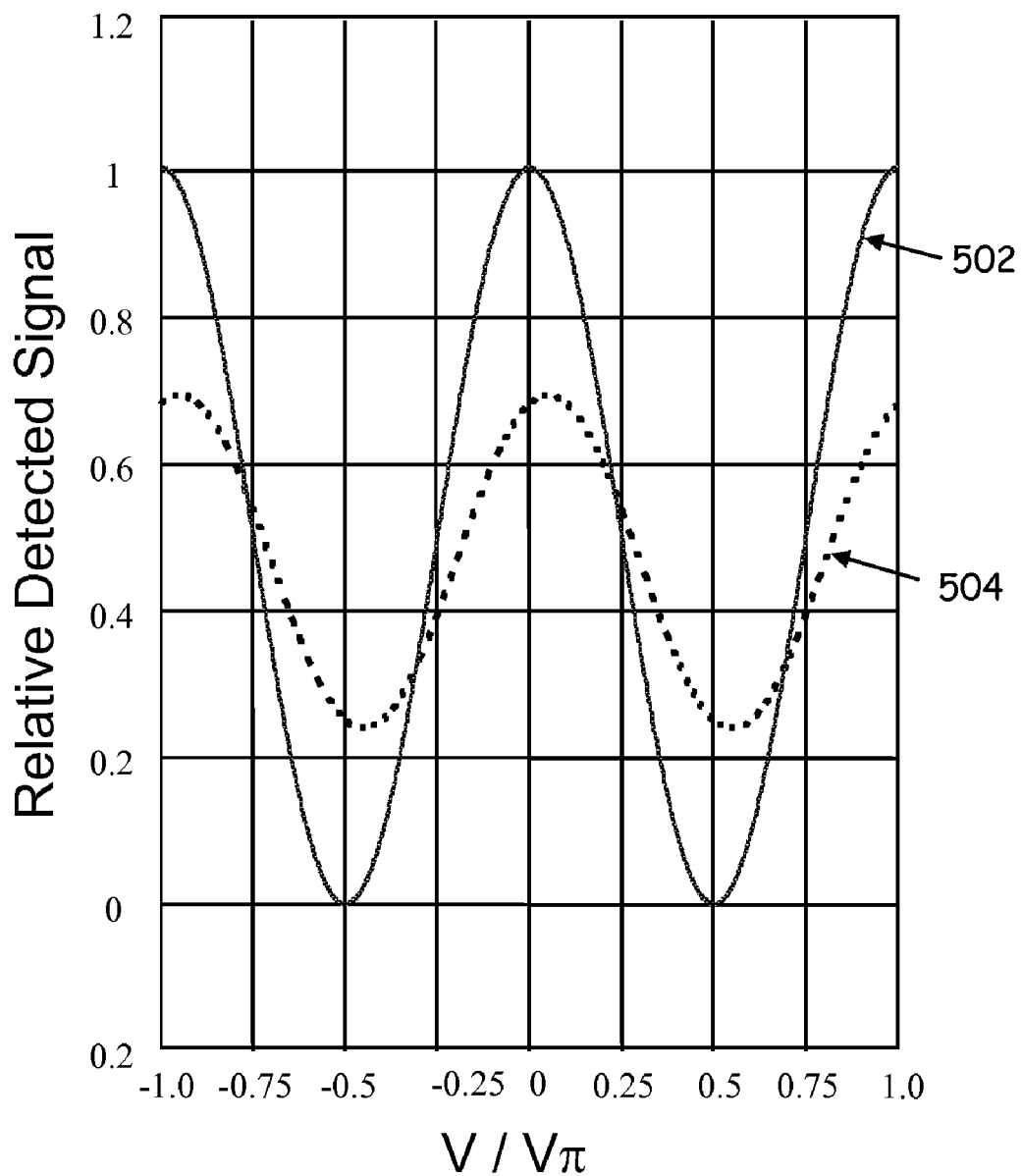
FIG. 5 is a graph of the detected signal in relative units vs. normalized drive voltage on a MZ modulator.
Figure 6A:
FIGS. 6a and 6b are circuit diagrams of photodiodes connected either in series (6a) or parallel (6b)
Figure 6B:
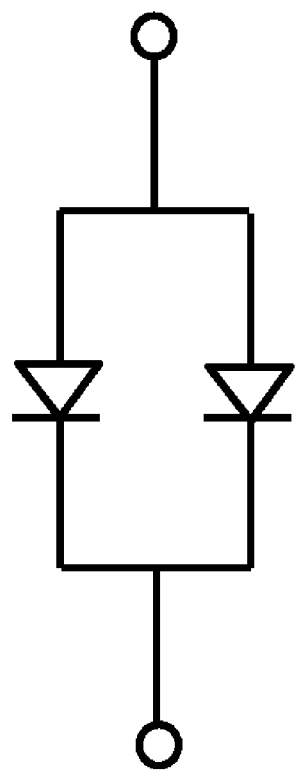
Figure 7:
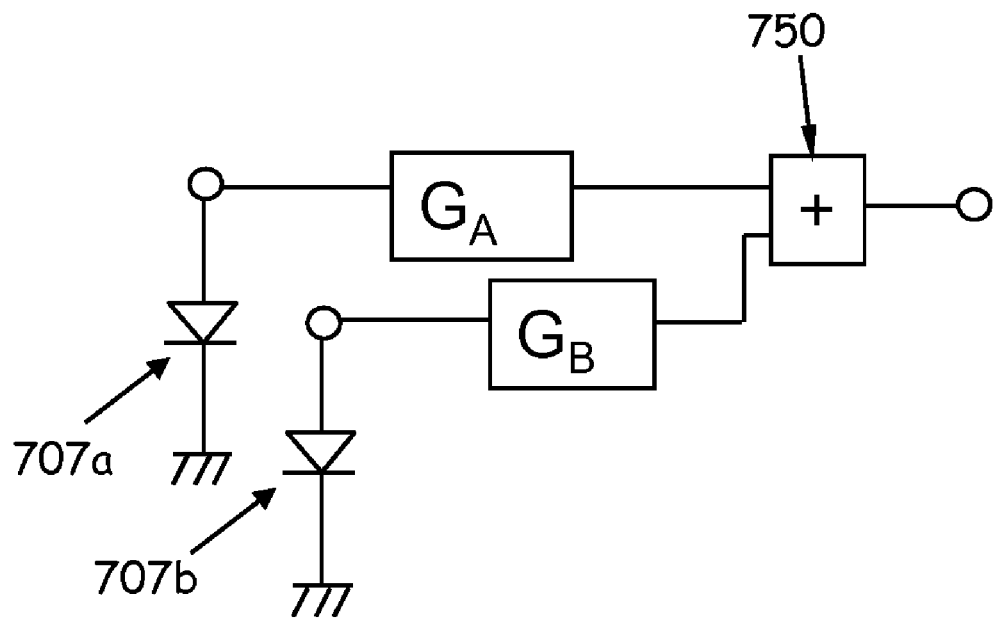
FIG. 7 is a schematic of a circuit with two photodetectors, gain elements and a summing unit.

The circuit in FIG. 7 shows one embodiment of the invention that allows for independent control of the response of each photodetector 707a, 707b, for the photodetector arrangement shown in FIG. 4d by adjusting amplifier gains $G_A$, $G_B$ before summing or differencing them in a summing circuit 750. Other circuits can be implemented to sum the photocurrents, as well. Independent control of the gains $G_A$, $G_B$ associated with each photodetector 707a, 707b allows Equation 6 to be easily satisfied. In the case of an active or passive circuit connected to each photodetector 707a, 707b, Equation 6 becomes $$G_B R_B A_{02} A_{12} = G_A R_A A_{01} A_{11} \quad (8)$$

where $G_A$ and $G_B$ are the transimpedance gain of the active or passive circuit, given in V/mA. The two variables $G_A$ and $G_B$ are adjusted to assure that Equation 8 is satisfied, resulting in zero or negligible phase tracking error. The circuit shown in FIG. 7 may be integrated in the modulator package and may be passive or active, active implying the need for amplifiers or op-amp circuits which require electrical power. A passive circuit utilizes some combination of resistors and possibly other components (capacitors and inductors) to allow for tunable summation of the photocurrents.

A second aspect of the invention is to reduce the amount of on-state light reaching the photodetector 707a, 707b, which in turn reduces the phase tracking error.

Figure 8A:
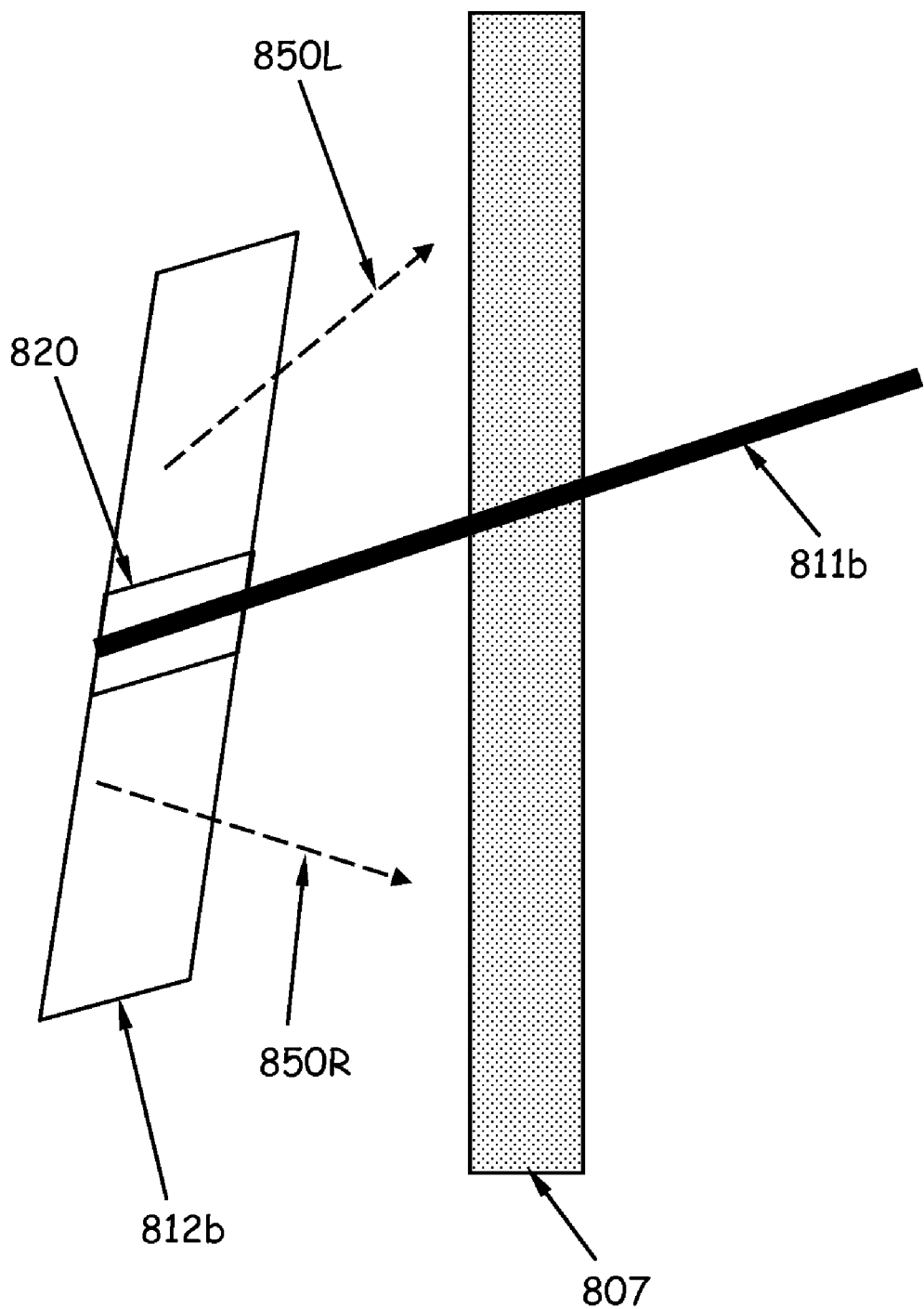
FIGS. 8a and 8b are top cross-sectional views of a fiber block with light blocking or opaque epoxy used to mount the output optical fiber.

FIG. 8a is a detailed top view of a fiber block 812b with light blocking or opaque epoxy 820 used to mount the output optical fiber 811b. The opaque epoxy 820 absorbs the on-state light radiated at the junction of the modulator output waveguide and the output optical fiber 811b. The PD 807, located underneath the output optical fiber 811b collects light shown by the dashed arrows 850L, 850R that is radiated into the substrate, after it passes through the transparent fiber block 812b.

Figure 9A:
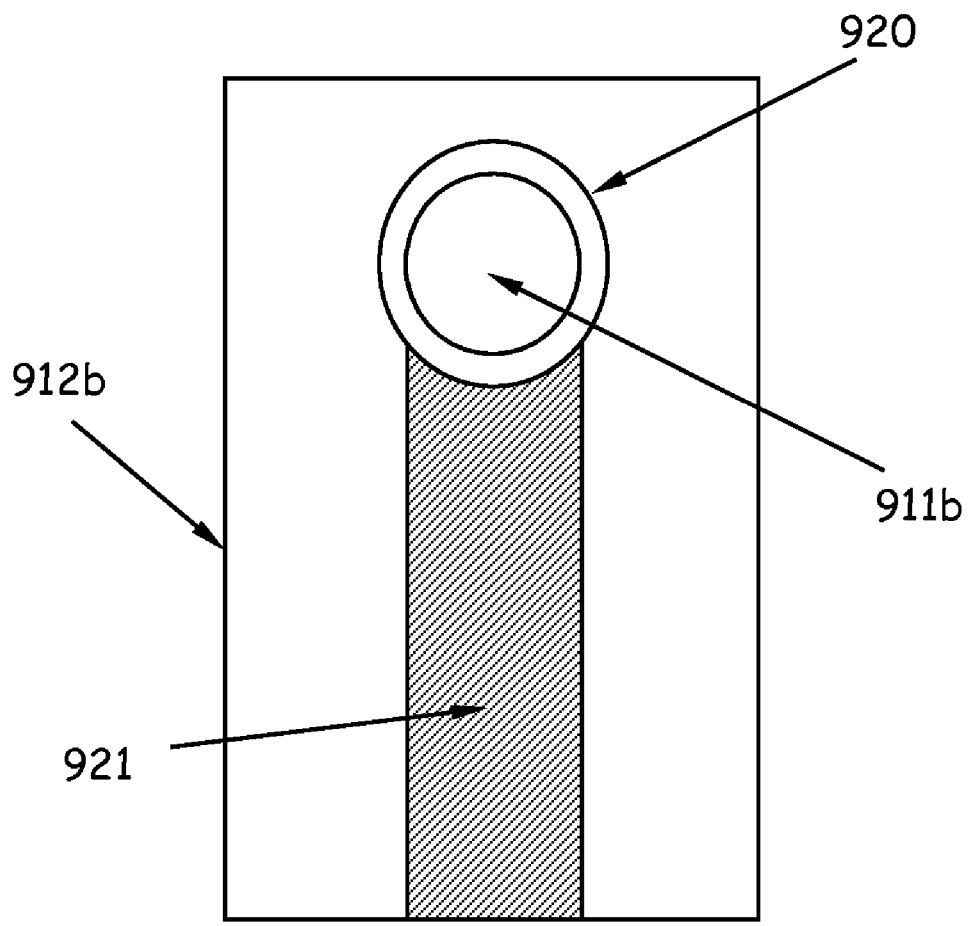
FIGS. 9a-9h are rear views of various embodiments of fiber blocks for controlling on- and off-state light access to photodetectors according to the present invention.

FIG. 9a is a rear view of the fiber block 912b carrying an optical fiber 911b that is surrounded with opaque epoxy 920. A suitable light blocking or absorbing coating 921 is applied down the center of the fiber block 912b either on the front or the rear or both. The light blocking or absorbing coating 921 assists in blocking or absorbing on-state light radiated by y-junctions and other waveguide features. The absorbing coating 921 can be a metal, or more advantageously, an absorptive paint or material to prevent the on-state light from being reflected to other points within the device, which may eventually reach the photodetector. Note that the opaque epoxy 920 can be used without the absorbing coating 921 or vice-versa, in cases where the radiated on-state light is blocked sufficiently.

Figure 9B:
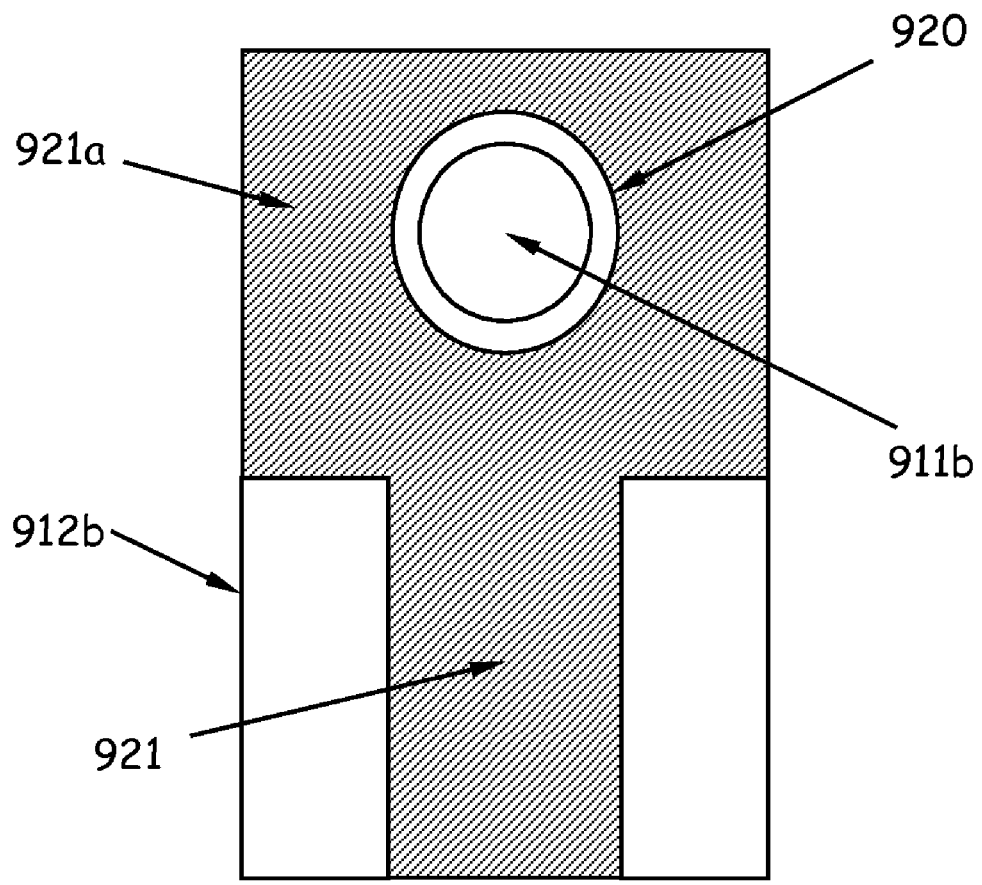
Figure 9C:
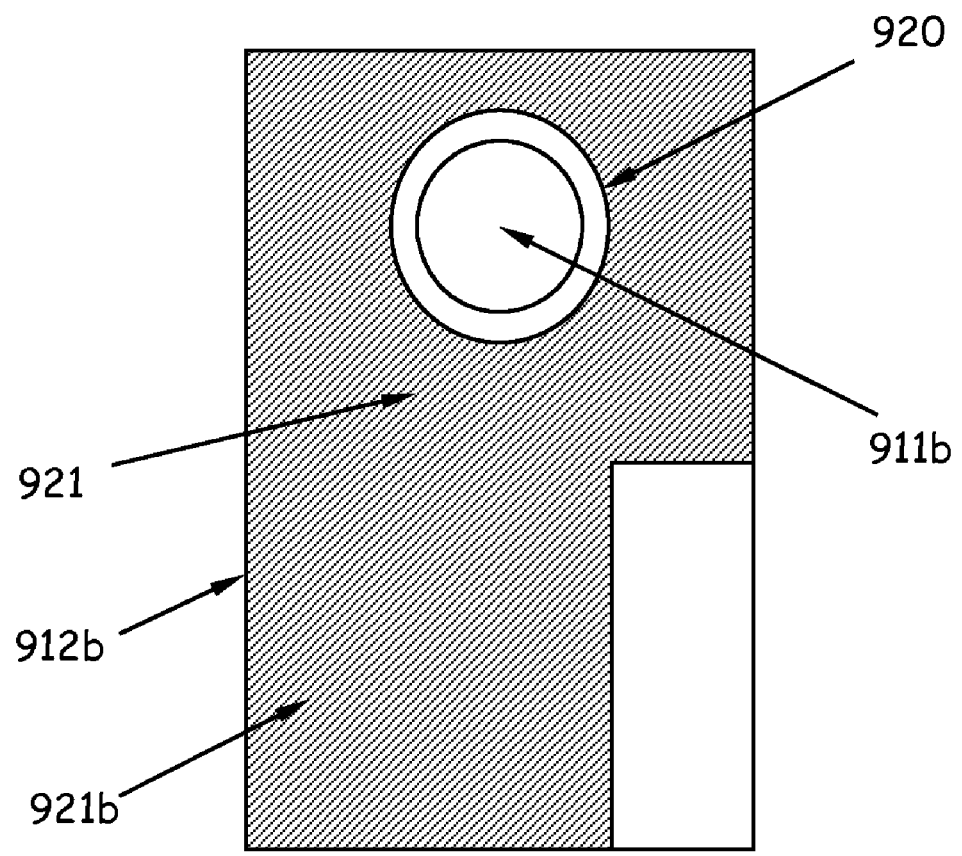

FIG. 9b is a rear view of another embodiment, where some additional light blocking or absorptive material 921a is applied near the top of the fiber block 912b. FIG. 9c is a rear view of a further embodiment where in addition to blocking/absorbing on-state light, the absorbing coating 921 is applied on one side near the bottom left corner 921b, in order to block or absorb one lobe of the off-state light. The embodiment in FIG. 9c prevents interference between the two lobes of the off-state light, should the lobes be reflected one or more times, and allowed to overlap causing variation in response with position, wavelength, and even perhaps temperature. Note that the blocking or absorbing coating can be applied to the front or rear or both of the fiber block. An alternative to mounting the optical fiber 911b with opaque epoxy 920 is to use a clear epoxy for mounting the fiber in the block, and apply a light blocking or absorbing coating on and around the clear epoxy, at the front and/or rear of the fiber block 912b.

Figure 8B:
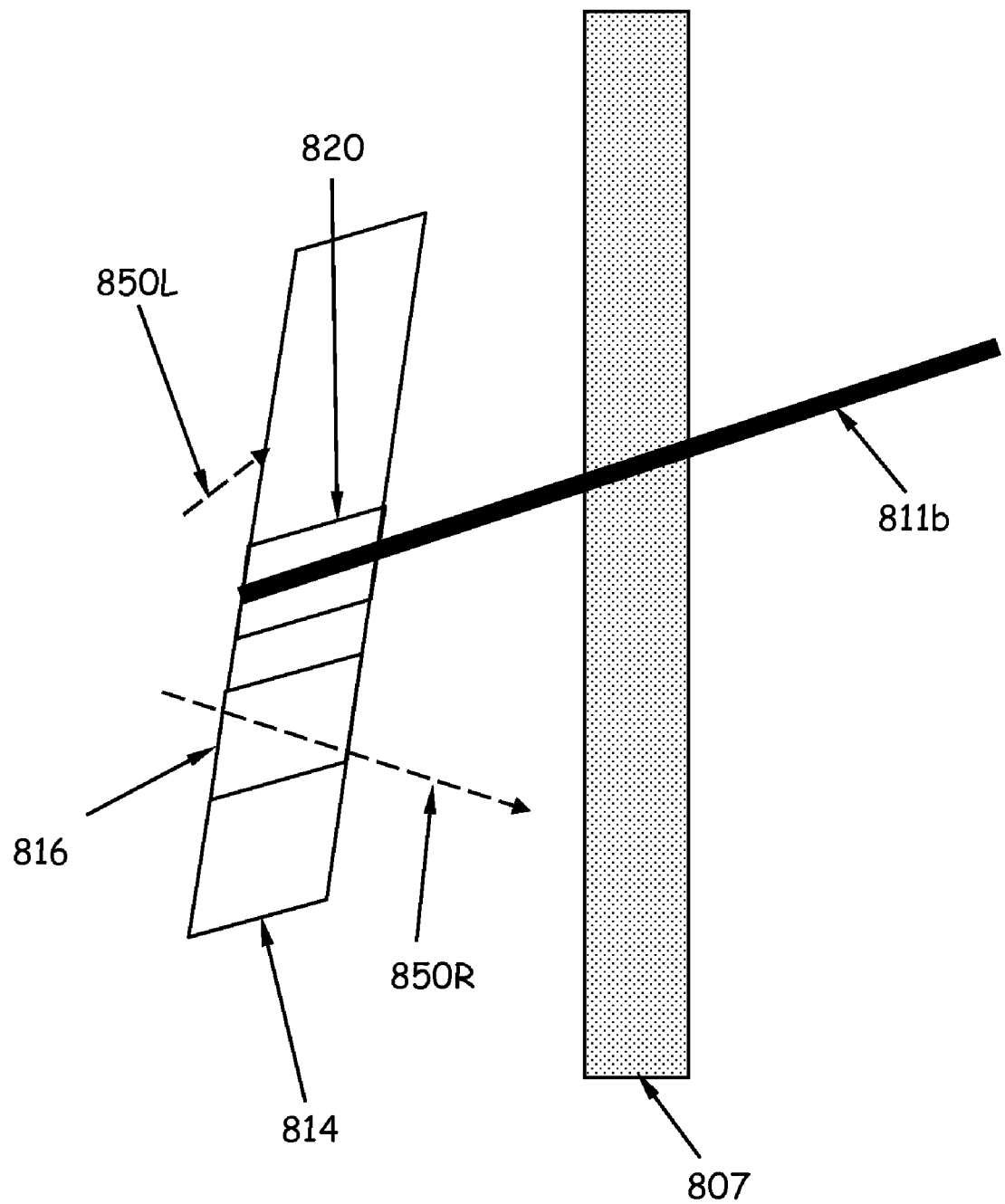

FIG. 8b is a detailed top view of a fiber block 814 that is made of light absorbing material with one transparent section 816. The PD 807, located underneath the output optical fiber 811b collects light from one lobe of the off-state light shown by the dashed arrow 850R that is radiated into the substrate, after it passes through the transparent section 816. The other lobe, shown by the dashed arrow 850L is blocked by the opaque fiber block 814. This is similar to the embodiment described in FIG. 9c. Such a design may be easier to manufacture than one involving coatings.

Figure 9D:
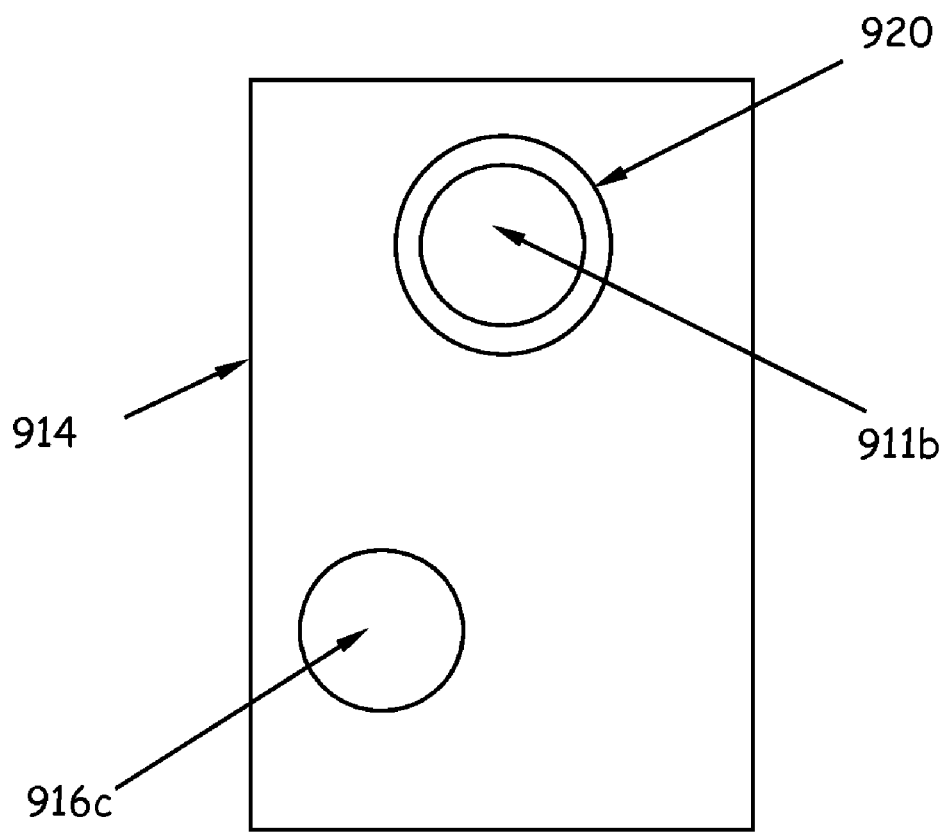

FIG. 9d is a rear view of the opaque fiber block 914 corresponding to 814 shown in FIG. 8b. The opaque epoxy 920 and the opaque fiber block 914 absorb most of the on-state light, while one lobe of the off-state light passes through a cylindrical transparent section 916c made of transparent material. If the optical index of the transparent material is sufficiently larger than that of the absorptive material of the opaque fiber block 914, all of the off-state light will be guided through the opaque fiber block 914 with total internal reflection occurring at the interface of the two materials. In this case, the transparent section 916c acts as a light pipe. Alternatively, the sides of cylindrical transparent section 916c could be coated with reflective metal and inserted into the absorptive fiber block.

Figure 9E:
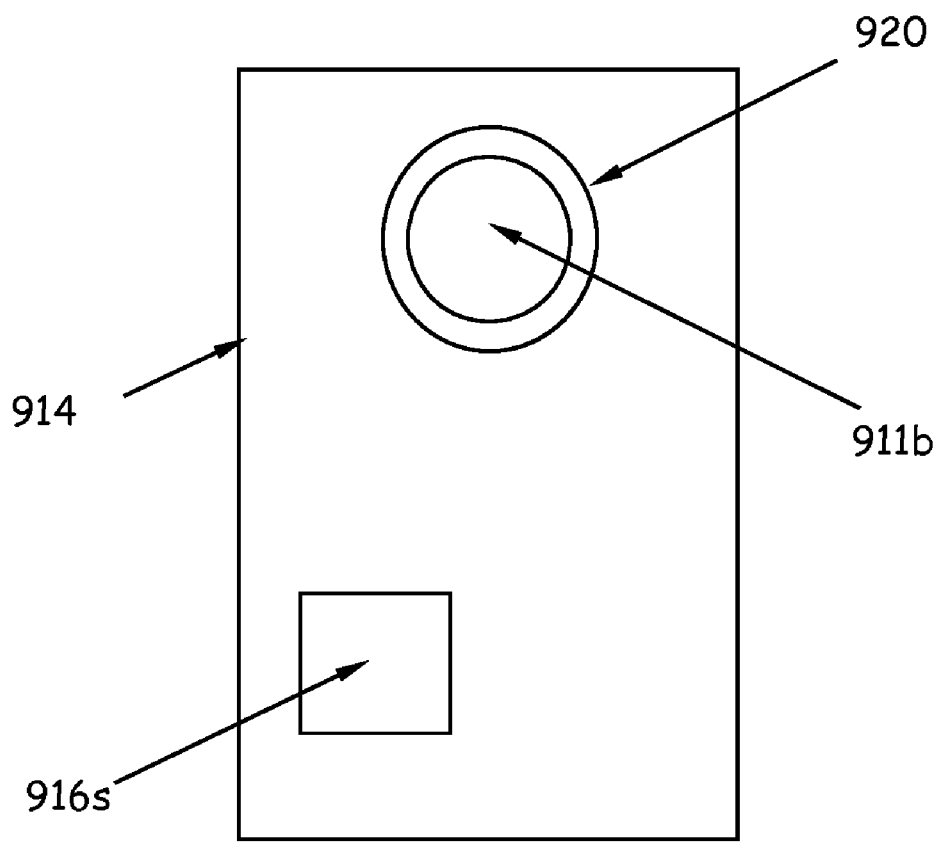
Figure 9F:
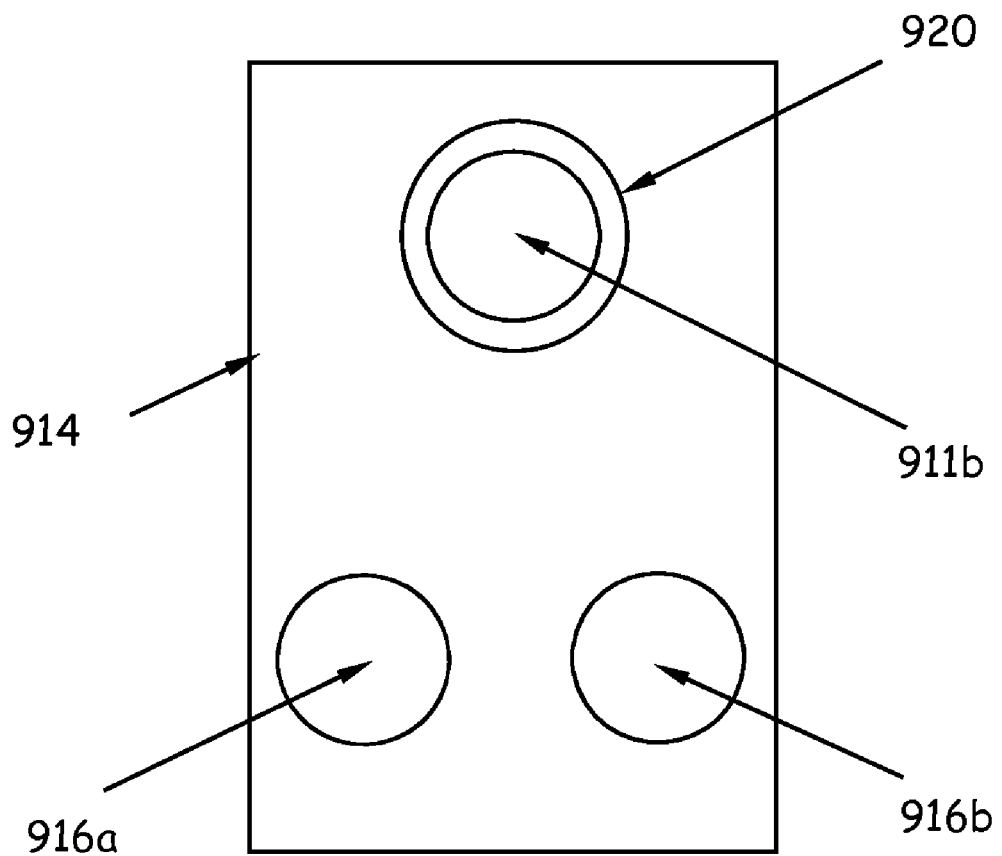

FIG. 9e shows a design similar to design the one in FIG. 9d, with the exception that the transparent section 916s has flat sides, revealing a square profile at the rear instead of circular. In principle, the shape of the transparent section 916s could be adjusted to tailor the shape of the radiation pattern exiting the opaque fiber block 914. Alternatively, a cylindrical transparent region may be easier to manufacture than other shapes. FIG. 9f shows the opaque fiber block 914 with two transparent sections, 916a, 916b, to allow both lobes of off-state light to reach one or more photodetectors.

Figure 9G:
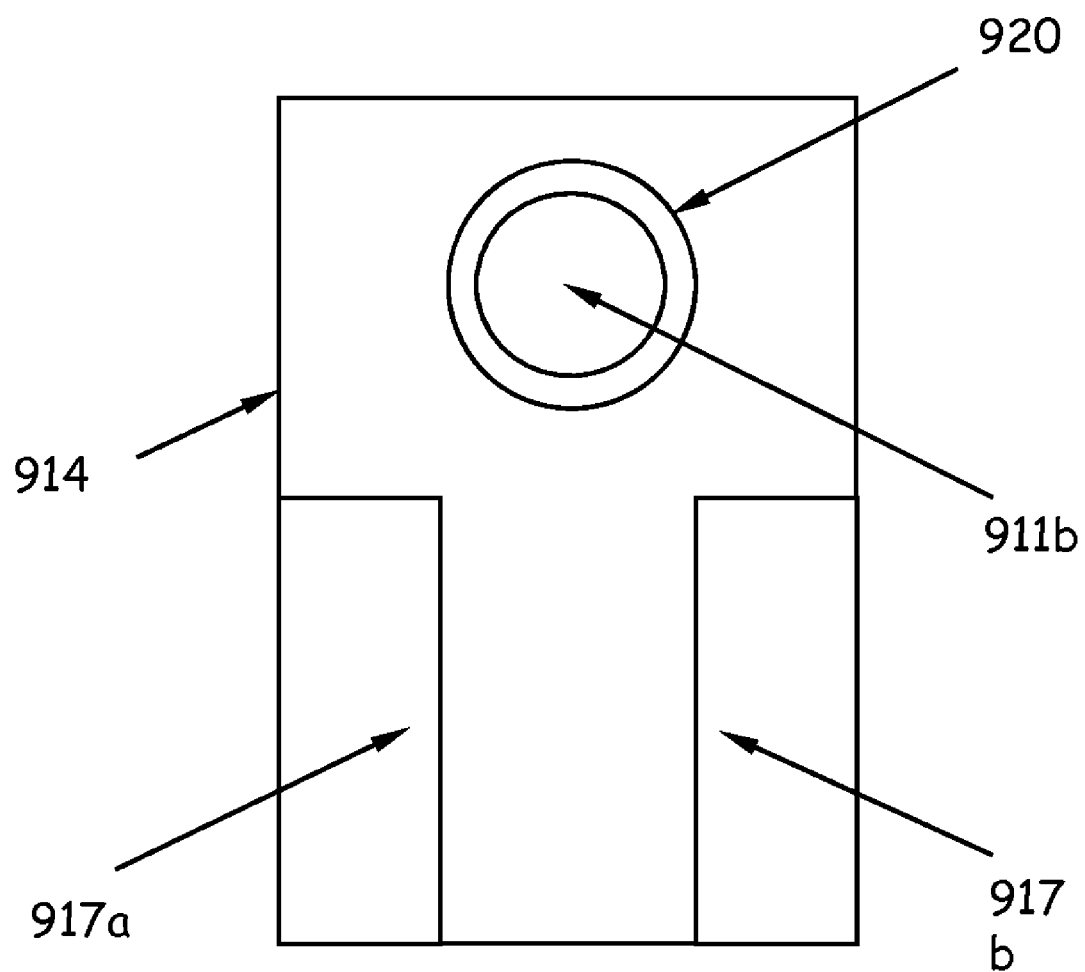

FIG. 9g is a rear view of the opaque fiber block 914 where the two transparent sections, 917a, 917b, having flat sides and two sides extending to the outer boundary of the opaque fiber block 914. The off-state light can still be guided within the transparent sections 917a, 917b if its optical index is sufficiently higher than the optical index of the absorptive material of the opaque fiber block 914. Note that the index change at the outer air-block boundary is much larger, resulting in total internal reflection at that interface as well.

Figure 9H:
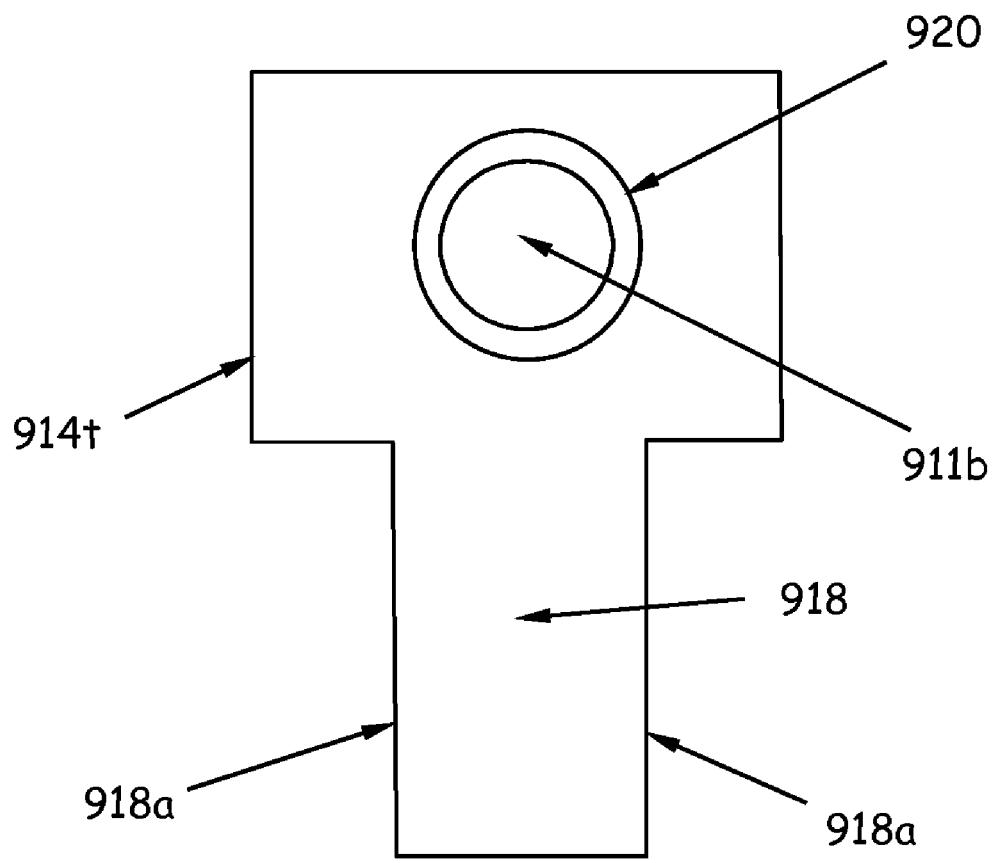

FIG. 9h is a rear view of a "T" shaped opaque fiber block 914t. The "T" shape causes most of the on-state light, which is strongest in the central area 918, to be absorbed. The two lobes of the off-state light pass around the side edges 918a of the opaque fiber block 914t. As the off-state light is not completely guided, however, strong reflection along the side edges 918a of the opaque fiber block 914t may help to guide the off-state light to a photodetector.

Figure 10:
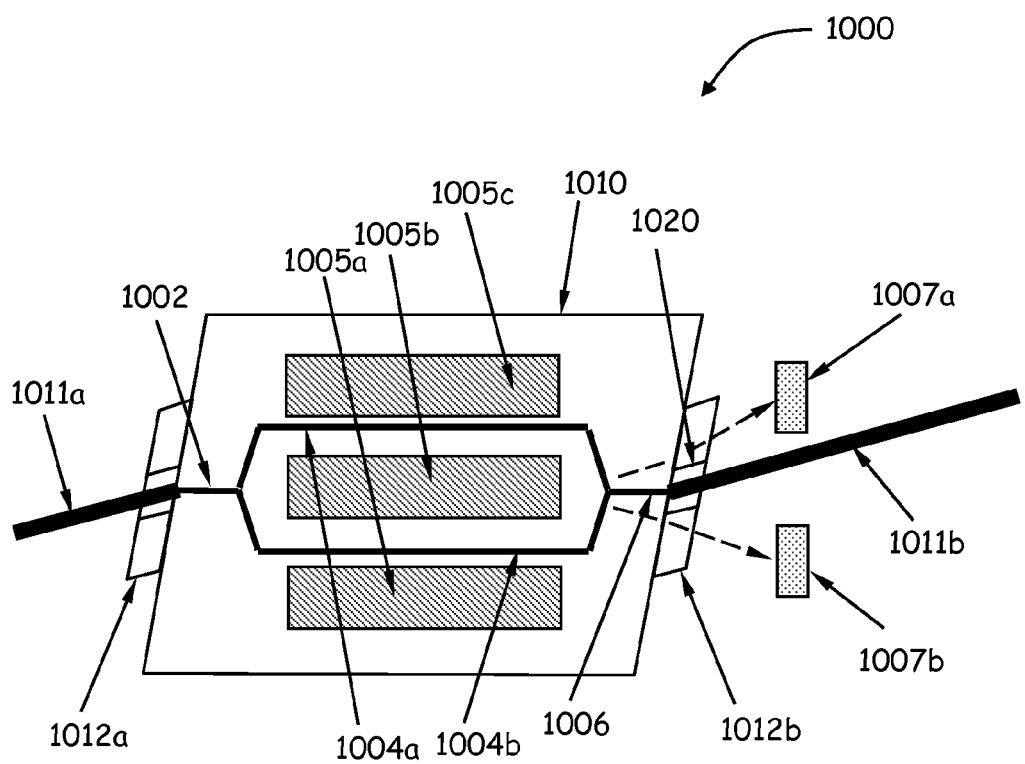
FIG. 10 is a top view of a dual photodetector MZ module according to the present invention.

In FIG. 10, a MZ modulator assembly 1000 with free-space photodetectors (PD) 1007a, 1007b is integrated with a modulator chip 1010 comprising an electro-optic dielectric material. An input light signal is coupled into a MZ modulator input waveguide 1002 from input optical fiber 1011a held in place on the modulator chip 1010 by a fiber block 1012a. The light signal in the input waveguide 1002 is split into two arms 1004a, 1004b of the MZ, modulated by voltage signals applied between an RF signal electrode 1005b and RF ground electrodes 1005a, 1005c and recombined into output waveguide 1006. The output waveguide 1006 is coupled into an output optical fiber 1011b, attached to the modulator chip 1010 by a fiber block 1012b. The photodetectors 1007a, 1007b, are located to collect light that is radiated into the substrate, after it passes through the fiber block 1012b. The photodetectors 1007a, 1007b may or may not be biased with a voltage across it. The light illuminating the photodetectors 1007a, 1007b causes a photocurrent to be generated. The photodetectors 1007a, 1007b are connected to an electrical circuit such as a transimpedance amplifier or op amp circuit that amplifies the photocurrent, converting it into a voltage.

The fiber block 1012b may comprise a light absorbing or opaque material combined with light blocking or absorbing coating 1020 to allow for best suppression of on-state light at the photodetectors 1007a, 1007b and the capability to tune out any residual phase tracking error. For example, the fiber block structures described in FIGS. 9a-h could be implemented. Light absorbing epoxy 1020 is the only light absorbing structure shown in FIG. 10.

Figure 11:
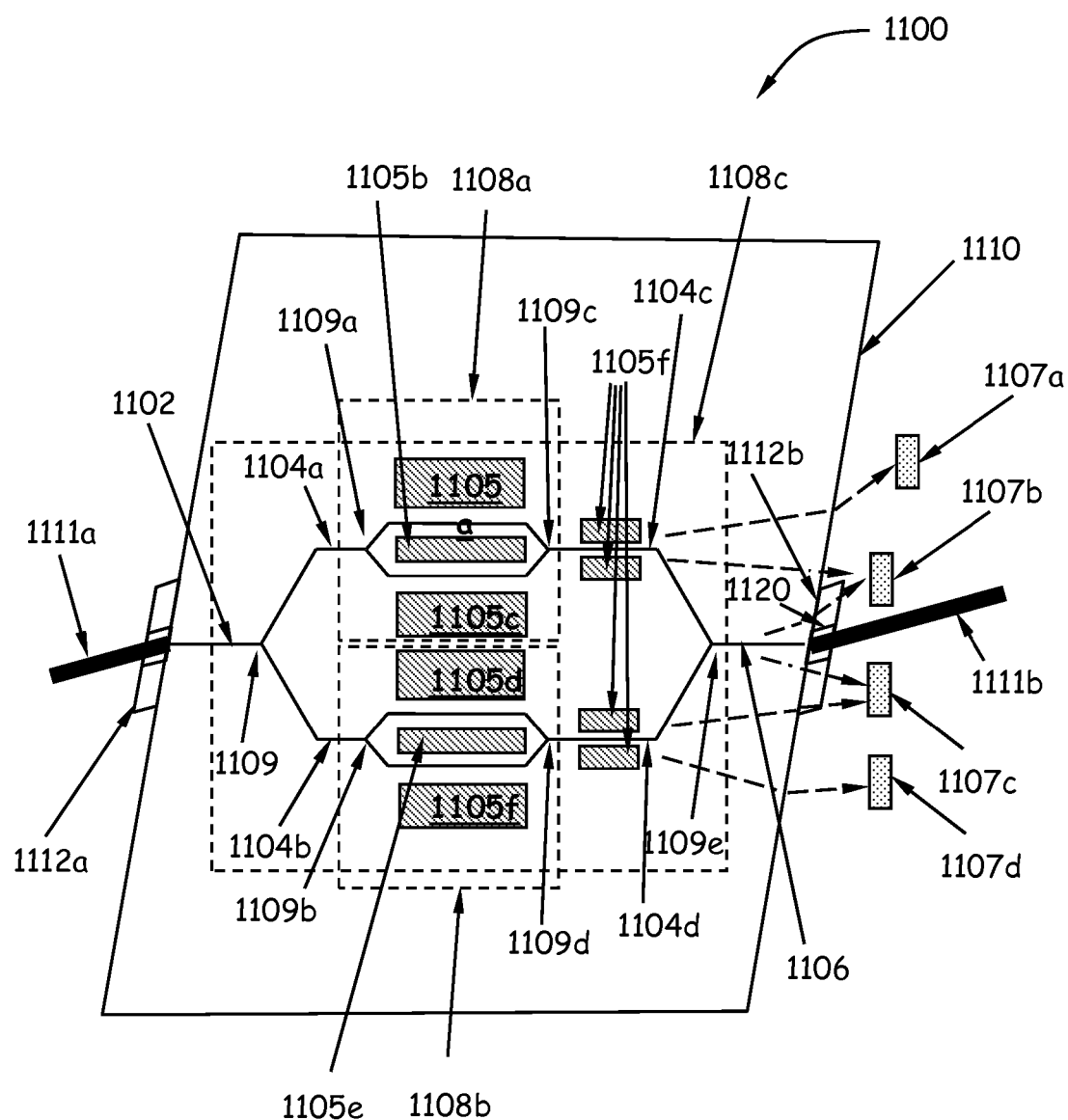
FIG. 11 is a top view of a quad photodetector dual MZ module according to the present invention.

An embodiment of a more complicated modulator—a Dual-Parallel Mach-Zehnder (DPMZ) 1100 is shown in FIG. 11, in which an array of photodetectors 1107a-d monitor the off-state light radiated from all locations from within the more complex interferometer chip 1110.

An input light signal is coupled into the DPMZ modulator 1100 via input waveguide 1102 from input optical fiber 1111a held in place on the modulator chip 1110 by a fiber block 1112a. The light in the input waveguide 1102 is split into two arms 1104a, 1104b of the DPMZ 1100 at Y-junction 1109. The two arms 1104a, 1104b constitute input waveguides to inner MZ modulators 1108a, 1108b, respectively, where Y-junctions 1109a, 1109b split the light into two paths as in the MZ 1000 described in FIG. 10.

The signals in the inner MZ modulators 1108a, 1108b are modulated by RF signal electrodes 1105b, 1105e and RF ground electrodes 1105a, 1105c, 1105d, 1105f, then recombined in Y-junctions 1109c, 1109d, respectively, into two arms 1104c, 1104d of an outer MZ 1108c. Bias electrodes 1105f adjust the phase of light signals in the two arms 1104c, 1104d before they are recombined at Y-junction 1109e into output waveguide 1106. The output waveguide 1106 is optically coupled to an output optical fiber 1111b, which is held in place by light-blocking epoxy 1120 in a fiber block 1112b, attached to the modulator chip 1110.

The photodetectors 1107a-1107d, located to collect light that is radiated into a substrate of the DPMZ modulator chip 1110, after it passes through the fiber block 1112b. For the fiber block 1112b, structures such as those described in FIGS. 9a-h could be implemented, for example, appropriately modified for the number of photodetectors used. The photodetectors 1107a-1107d may or may not be biased with a voltage. Light illuminating the photodetectors 1107a-1107d causes a photocurrent to be generated. The photodetectors 1107a-1107d are connected to an electrical circuit such as a transimpedance amplifier or op amp circuit that amplifies the respective photocurrents, converting them into a voltages.

Photodetectors 1107b, 1107c collect radiated light primarily from the y-junction combiner 1109e of the outer MZ 1108c, while PD 1107a primarily collects one lobe of light radiated from the inner MZ modulator 1108a and PD 1107d primarily collects one lobe of light radiated from the inner MZ modulator 1108b.

Figure 12:
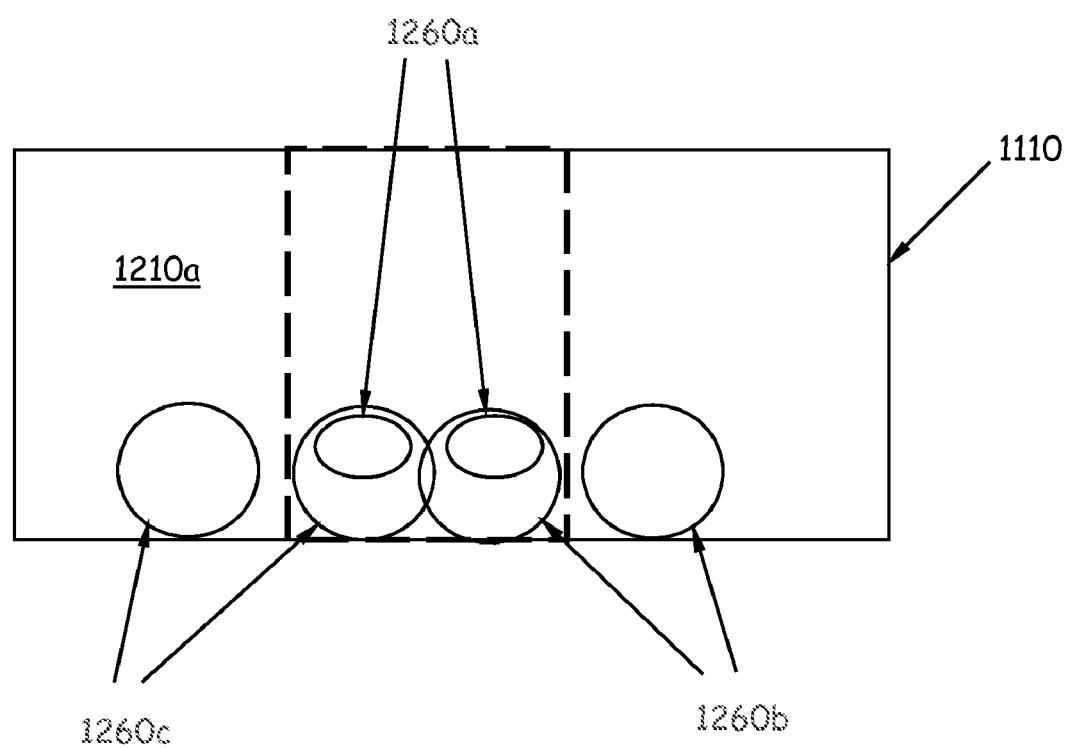
FIG. 12 is a rear view of the modulator substrate, looking from the PD's towards the substrate illustrating the locations of radiated light.

FIG. 12 shows a rear view of the modulator substrate 1210a of MZ modulator chip 1110, looking from the photodetectors 1107a-d towards the substrate 1210a. Locations of light radiated from the DPMZ 1100 are illustrated as circles or ellipses 1260a, 1260b and 1260c. The y-junction 1109e for the outer MZ 1108c is closer to an output edge of the substrate 1210a, hence the radiation patterns for off-state light 1260a will be closer to the top surface of the substrate 1210a, and encompass a smaller area. The y-junctions 1109a, 1109b for the inner MZ modulators 1108a, 1108b are farther from the output edge of the substrate 1210a, hence the radiated off-state light 1260b and 1260c from the inner MZ modulators 1108a, 1108b, respectively, will be further from the top surface of the substrate 1210a, and encompass a wider area.

Figure 13:
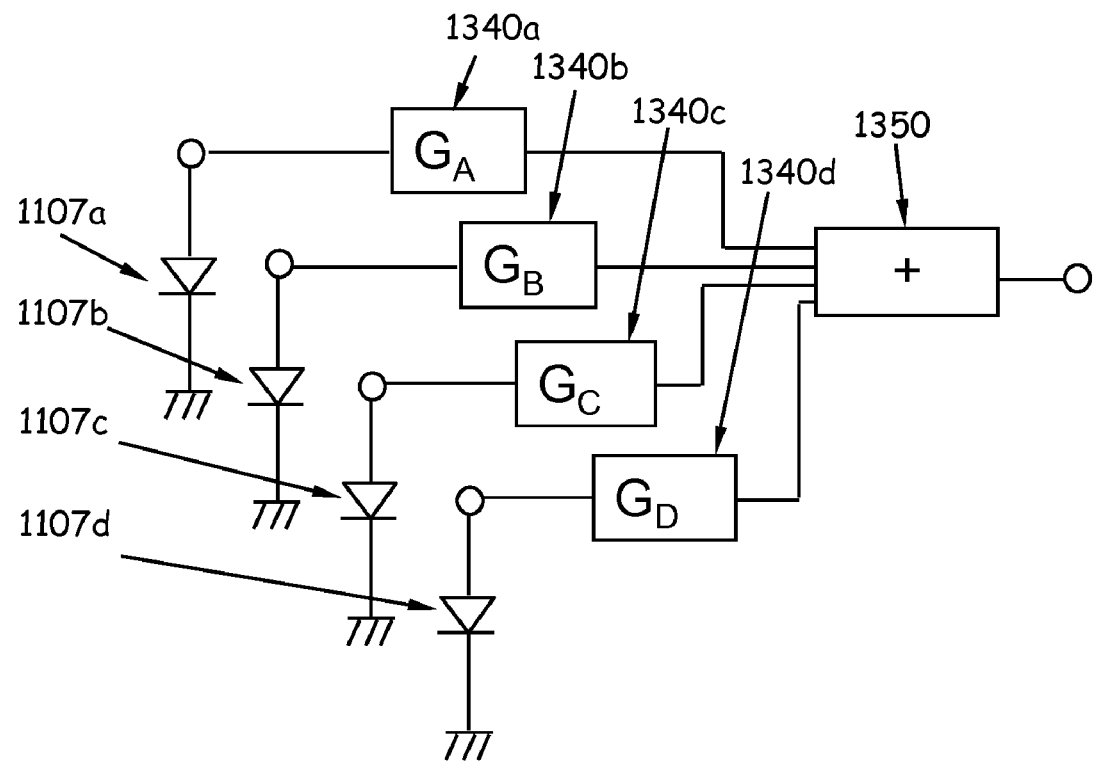
FIG. 13 is a schematic of a circuit with four photodetectors, gain elements and a summing unit.

In general, there will be some overlap between the various lobes of off-state light and on-state light 1260a, 1260b and 1260c on the photodetectors 1107a-d, potentially causing some phase tracking error. The circuit shown in FIG. 13 is used to adjust signals from several or all of the photodetectors 1107a-d before summing or differencing them in a summing circuit 1350 in order that the components affecting phase tracking error can be nulled out. Gain coefficients $G_A$, $G_B$, $G_C$, and $G_D$, of transimpedance amplifiers 1340a-d correspond to PD's 1307a-d, respectively. For example, for tracking the phase of the inner MZ modulator 1108a, the signal from photodetector 1107a is summed with small amounts of signal from one or more of the other photodetectors 1107b-d. The transimpedance gain coefficients $G_B$, $G_C$, and $G_D$ for the other photodetectors 1107b-d may have the same or inverted polarity relative to photodetector 1107a. Large amounts of signal from the photodetectors 1107b and 1107c are summed together with small amounts of signals from the photodetectors 1107a and 1107d to provide a control signal for the outer MZ 1108c. A large amount of signal from photodetector 1107d is summed with small amounts of signal from the other the other photodetectors 1107a-c to provide a signal to control the phase of the inner MZ modulator 1108b. Light absorbing epoxy is the only light absorbing structure within the fiber block shown in the FIG. 11, however, other light absorbing or light guiding structures described earlier may be used with the more complex DPMZ modulator 1100. In addition, an array of two, three, four, or more photodetectors may be used to monitor phase of the various MZ's within the DPMZ modulator 1100.

Several summing circuits, one for each inner or outer MZ could be wired in parallel. In this case, a transimpedance amplifier acting as a buffer circuit is provided for each photodetector. The transimpedance gain coefficients $G_A$, $G_B$, $G_C$, and $G_D$ become voltage gain coefficients of the summing circuits. Each summing circuit has its own unique set of gain coefficients, in order that the phase of a particular inner or outer MZ is tracked independently.

We claim:

1. A phase tracking monitor integrated with a Mach-Zehnder interferometric modulator comprising:
 an optical waveguide element comprising:
  an input optical waveguide for receiving an input optical signal;
  two branched optical waveguides, each guiding a portion of the input optical signal;

an input Y-junction optically coupling the input optical waveguide to the two branched optical waveguides;

an output optical waveguide for optically coupling to an output optical fiber; and an output Y-junction optically coupling the two branched optical waveguides to the output optical waveguide for causing the portions of the input optical signal propagating from the two branched optical waveguides to interfere with each other;

a substrate comprising an electro-optic dielectric material for supporting the optical waveguide material on an upper surface thereof;

a set of electrodes for applying an electric field proximate to the two branched optical waveguides for modulating a phase of the portions of the input optical signal propagating therethrough to generate a modulated optical signal having an on-state and an off-state at the output Y-junction;

wherein in the on-state the modulated optical signal generates a guided mode in the output optical waveguide; and wherein in the off-state the modulated optical signal generates a radiating mode comprising a left lobe and a right lobe in the substrate;

a fiber block attached to an output edge of the substrate for stably supporting the output optical fiber to receive the guided mode from the output optical waveguide;

a first photodetector for generating a first photocurrent in response to light transmitted from the output edge of the substrate; and light-blocking material disposed between the output edge of the substrate and the first photodetector for blocking a portion of the radiating mode and the guided mode that reach the first photodetector.

2. The phase tracking monitor of claim 1, wherein a portion of the fiber block is comprised of the light blocking material, and a portion of the fiber block is comprised of a transparent material for permitting one or more of the left lobe and the right lobe to reach the first photodetector.

3. The phase tracking monitor of claim 1, wherein the fiber block comprises the light blocking material shaped so as to permit one or both of the left lobe and the right lobe to reach the first photodetector.

4. The phase tracking monitor of claim 1, wherein the fiber block comprises an optically transparent material and the light-blocking material comprises a light-blocking coating on an area of the fiber block for blocking one or more of the left lobe, the right lobe and the guided mode from reaching the first photodetector.

5. The phase tracking monitor of claim 1, wherein the light-blocking material comprises a light blocking coating on a portion of the output optical fiber supported by the fiber block for blocking a portion of the guided mode from reaching the first photodetector.

6. The phase tracking monitor of claim 5, wherein the light blocking material comprises an optically opaque adhesive, which fixes the output optical fiber to the fiber block.

7. The phase tracking monitor of claim 5, further comprising a second photodetector for generating a second photocurrent in response to light transmitted from the output edge of the substrate, wherein the fiber block comprises an optically transparent material and the first and second photodetectors are positioned to collect the left and right lobes, respectively.

8. The phase tracking monitor of claim 7, further comprising a summing circuit for generating a phase tracking signal from an algebraically weighted sum of the first and the second photocurrent.

9. The phase tracking monitor of claim 8, further comprising a first transimpedance amplifier having a first adjustable gain for receiving the first photocurrent and a second transimpedance amplifier having a second adjustable gain for receiving the second photocurrent.

10. The phase tracking monitor of claim 5, further comprising:

a second, a third and a fourth photodetector for generating a second, a third and a fourth photocurrent, respectively, in response to light transmitted from the output edge of the substrate;

a first and a second inner Mach-Zehnder modulator optically coupled between the input Y-junction and each of the two branched optical waveguides;

a summing circuit for generating a phase tracking signal from an algebraically weighted sum of the first, the second, the third and the fourth photocurrent; and wherein the fiber block comprises an optically transparent material.

11. A method for reducing phase tracking error in a Mach-Zehnder optical modulator, including an input waveguide, an output waveguide and a set of electrodes supported on a substrate, with an output fiber coupled to the output waveguide via an optical block, with a light blocking portion, fixed to the substrate, comprising:

providing a modulating signal and a bias signal to the set of electrodes;

coupling an input signal into the input waveguide;

detecting with a first photodetector a first lobe of an off-state radiating mode emitted from the substrate;

blocking an on-state mode guided in the output waveguide from reaching the first photodetector with the light-blocking portion; and adjusting the bias signal in response to a first photocurrent in the first photodetector to maintain a desired set point of the interferometric modulator at quadrature.

12. The method of claim 11, further comprising:

detecting with a second photodetector a second lobe of an off-state radiating mode emitted from the substrate; and adjusting the bias signal in response to the first photocurrent and a second photocurrent in the second photodetector to maintain a desired set point of the interferometric modulator at quadrature.

* * * * *